US009064063B1

(12) United States Patent
Yu et al.

(10) Patent No.: US 9,064,063 B1
(45) Date of Patent: Jun. 23, 2015

(54) METHODS, SYSTEMS, AND ARTICLES OF MANUFACTURE FOR IMPLEMENTING INTERACTIVE, REAL-TIME CHECKING OR VERIFICATION OF COMPLEX CONSTRAINTS

(75) Inventors: Henry Yu, Palo Alto, CA (US); Joshua Baudhuin, Portland, OR (US); Regis Colwell, Gibsonia, PA (US); Harsh Deshmane, Sunnyvale, CA (US); Elias L. Fallon, Allison Park, PA (US); Sanjib Ghosh, Uttar Pradesh (IN); Anjna Khanna, New Dehli (IN); Yinnie Lee, Campbell, CA (US); Harindranath Parameswaran, Uttar Pradesh (IN); Pardeep Juneja, Delhi (IN); Roland Ruehl, San Carlos, CA (US); Simon Simonian, San Jose, CA (US); Hui Xu, Wexford, PA (US); Timothy Rosek, Gibsonia, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 39 days.

(21) Appl. No.: 13/445,860

(22) Filed: Apr. 12, 2012

Related U.S. Application Data

(60) Provisional application No. 61/582,217, filed on Dec. 30, 2011.

(51) Int. Cl.
*G06F 9/455* (2006.01)
*G06F 17/50* (2006.01)

(52) U.S. Cl.
CPC ..................................... *G06F 17/50* (2013.01)

(58) Field of Classification Search
USPC ............. 716/106, 107, 108, 111, 113, 51, 52, 716/136
See application file for complete search history.

(56) References Cited

U.S. PATENT DOCUMENTS

| | | | |
|---|---|---|---|
| 6,745,375 B1 * | 6/2004 | Carter | 716/106 |
| 8,028,259 B2 | 9/2011 | Vogel | |
| 8,176,445 B1 | 5/2012 | Qian | |
| 8,381,153 B2 | 2/2013 | Chiang et al. | |
| 8,397,194 B2 | 3/2013 | Uppaluri et al. | |

(Continued)

OTHER PUBLICATIONS

Non-Final Office Action dated Jan. 3, 2013 for U.S. Appl. No. 13/445,832.

(Continued)

*Primary Examiner* — Brian Ngo
(74) *Attorney, Agent, or Firm* — Vista IP Law Group, LLP

(57) ABSTRACT

Disclosed encompasses method, system, computer program product for implementing interactive checking of constraints. Various embodiments bridge schematic design environment and layout environment with a binder mapping process and utilize connectivity information from the schematic design to identify constraint violations early in the physical design stage. The method identifies or creates a layout and identifies or generates an object for a modification process. The method may take snapshot(s) of the design database or may use one or more logs for restoring the design database. The method then identifies or creates scratch pad(s) and performs modification process on the object to generate a change. The method uses scratch pad(s) and trigger(s) to perform constraint checking during the modification process to provide interactive feedback in response to the modification process before committing the change to the persistent database.

31 Claims, 13 Drawing Sheets

(56) References Cited

U.S. PATENT DOCUMENTS

| | | | |
|---|---|---|---|
| 8,516,404 B1 | 8/2013 | Cao et al. | |
| 2003/0229860 A1* | 12/2003 | Li | 716/1 |
| 2004/0068708 A1 | 4/2004 | Sivaraman et al. | |
| 2005/0221201 A1 | 10/2005 | Ellis | |
| 2005/0268258 A1* | 12/2005 | Decker | 716/4 |
| 2006/0200789 A1 | 9/2006 | Rittman | |
| 2006/0259882 A1 | 11/2006 | Lin et al. | |
| 2007/0148794 A1 | 6/2007 | Cha et al. | |
| 2008/0005713 A1* | 1/2008 | Singh et al. | 716/11 |
| 2008/0178140 A1* | 7/2008 | Lin et al. | 716/19 |
| 2008/0184183 A1* | 7/2008 | Kobayashi | 716/9 |
| 2008/0250361 A1* | 10/2008 | Bae et al. | 716/2 |
| 2009/0037852 A1* | 2/2009 | Kobayashi et al. | 716/2 |
| 2009/0083689 A1 | 3/2009 | Ringe et al. | |
| 2009/0150850 A1 | 6/2009 | Sinha et al. | |
| 2009/0254814 A1 | 10/2009 | Lai et al. | |
| 2009/0276735 A1* | 11/2009 | Kramer et al. | 716/4 |
| 2009/0313596 A1 | 12/2009 | Lippmann et al. | |
| 2010/0162151 A1 | 6/2010 | Class et al. | |
| 2010/0199235 A1* | 8/2010 | El Yahyaoui et al. | 716/2 |
| 2010/0229140 A1 | 9/2010 | Strolenberg et al. | |
| 2010/0257498 A1 | 10/2010 | Alpert et al. | |
| 2011/0219341 A1* | 9/2011 | Cao et al. | 716/50 |
| 2012/0023468 A1 | 1/2012 | Fischer et al. | |
| 2012/0023470 A1* | 1/2012 | Nakagawa | 716/113 |
| 2012/0023471 A1* | 1/2012 | Fischer et al. | 716/115 |
| 2012/0110521 A1* | 5/2012 | Agarwal et al. | 716/52 |
| 2012/0185811 A1* | 7/2012 | Ramachandran et al. | 716/108 |
| 2012/0227023 A1* | 9/2012 | Bendicksen et al. | 716/112 |
| 2012/0254818 A1* | 10/2012 | Liu et al. | 716/124 |
| 2013/0031521 A1* | 1/2013 | Teoh | 716/111 |
| 2013/0086542 A1* | 4/2013 | Teoh et al. | 716/113 |

OTHER PUBLICATIONS

Non-Final Office Action dated Apr. 5, 2013 for U.S. Appl. No. 13/445,847.
Non-Final Office Action dated Jan. 16, 2013 for U.S. Appl. No. 13/445,874.
Notice of Allowance dated Sep. 19, 2013 for U.S. Appl. No. 13/445,874.
Notice of Allowance dated Jun. 5, 2013 for U.S. Appl. No. 13/445,832.
Amendment After Non-Final Rejection dated Jul. 5, 2013, for U.S. Appl. No. 13/445,847.
Amendment After Non-Final Rejection dated Apr. 16, 2013, for U.S. Appl. No. 13/445,874.
Non-Final Office Action dated Jun. 5, 2013, for U.S. Appl. No. 13/445,874.

* cited by examiner

METHODS, SYSTEMS, AND ARTICLES OF MANUFACTURE FOR IMPLEMENTING INTERACTIVE, REAL-TIME CHECKING OR VERIFICATION OF COMPLEX CONSTRAINTS

CROSS-REFERENCE TO RELATED APPLICATION(S)

This application is cross-related to U.S. patent application Ser. No. 13/445,832, filed concurrently with the title "METHODS, SYSTEMS, AND ARTICLES OF MANUFACTURE FOR IMPLEMENTING A PHYSICAL DESIGN OF AN ELECTRONIC CIRCUIT WITH AUTOMATIC SNAPPING", U.S. patent application Ser. No. 13/445,874, filed concurrently with the title "METHODS, SYSTEMS, AND ARTICLES OF MANUFACTURE FOR IMPLEMENTING ELECTRONIC DESIGNS WITH CONNECTIVITY AND CONSTRAINT AWARENESS", and U.S. patent application Ser. No. 13/445,847, filed concurrently with the title "METHODS, SYSTEMS, AND ARTICLES OF MANUFACTURE FOR IMPLEMENTING INTERACTIVE COLORING OF PHYSICAL DESIGN COMPONENTS IN A PHYSICAL ELECTRONIC DESIGN WITH MULTIPLE-PATTERNING TECHNIQUES AWARENESS". The content of the aforementioned patent applications is hereby expressly incorporated by reference in its entirety for all purposes.

BACKGROUND

Conventional electronic design process proceeds sequentially through a schematic design stage to determine the schematic design of an electronic design, a physical design stage to construct the layout of the electronic design, and a verification stage at which various verification processes, such as design rule checking and physical verification, are performed to determine whether the electronic design complies with certain set of constraints, design rules, requirements, or goals (collectively constraints.) Nonetheless, any violations identified during the verification stage may require a costly and often time-consuming process to resolve such violations. For example, a layout designer may have to return to the physical design to move certain shapes or to reroute certain interconnects in order to satisfy a spacing constraint and re-submit the revised electronic design to the verification modules or design rule check engines to determine whether the revised electronic design satisfies the prescribed constraints or design rules. As a result, the electronic design process may involve an iterative process where designers loop among various stages of the process, hoping that the electronic design may be finally signed off for tapeout. In addition, a layout designer often does not know whether any portion of the layout violates certain constraints until the layout is complete and ready for verification. The advent of more complex design rules simply exacerbates the problems.

The recent advances in very deep sub-micron (VDSM) integrated circuits (ICs) have exacerbated the issues in the physical design methodology process of electronic circuits. For example, most conventional electronic circuit design tools focus on post-layout verification of the power grid or interconnects when the entire chip design is complete and detailed information about the parasitics of the physical designs and the currents drawn by the transistors are known. In these conventional approaches, the conventional circuit synthesis step is followed by layout synthesis and each step is carried out independent of the other. This is again followed by a physical or formal verification step upon the completion of the entire physical layout to check whether the desired performance goals have been achieved after layout generation and extraction. These steps are carried out iteratively in the conventional approaches till the desired performance goals are met. Nonetheless, such an iterative approach wastes significant amount of resources because various physical design tools, such as the placement tool, the router, etc., and various schematic design tools, such as the schematic editor, the schematic level simulator(s), etc., are unaware of the electrical parasitics associated with the physical data of the design and the electrical characteristics associated with the electrical parasitics.

Thus, there exists a need for providing a method, a system, and an article of manufacture for implementing interactive, real-time checking or verification of constraints.

SUMMARY

What is disclosed encompasses a computer implemented method, a system, and computer program product for interactive checking or verification of complex constraints. Various embodiments bridge the schematic design environment and the physical design environment and utilize the connectivity information from the schematic design to identify design rule violations, especially violations of complex design rules, early in the physical design stage such as during the placement or routing stage. The method first identifies or creates a physical design of an electronic design and identifies or generates a geometric shape representing an electronic component for a modification process. The modification process may include, for example, adding, removing, translating, rotating, mirroring, resizing the geometric shape in the physical design or placement, routing, or post-route optimization. The method may optionally take one or more snapshots of the design database at various time points or may use one or more logs such as one or more undo logs, redo logs, or state logs for restoring the design database to a certain point in time.

The method may then identify or create one or more scratch pads which comprise one or more data structures in a non-transitory computer accessible memory such as a volatile random access memory in some embodiments. The one or more scratch pads are used to temporarily store data or information arising from the modification process in some embodiments. In some embodiments, all the electronic design tools share the one or more scratch pads that also share all the modules, tools, or system resources. In some other embodiments, some electronic design tools may have their own scratch pads having their own modules, tools, or resources while the method or system ensures that the data or information are properly interchanged. For example, the method or the system utilizes the one or more scratch pads to store changes in design data of the electronic design during the modification process without committing these changes in these embodiments. In this example, the data or information in the one or more scratch pads is used together with the data or information in the design database to define the electronic design. In some embodiments, the method or the system may also initiate an ACID database transaction and associate the database transaction with the modification process and the one or more scratch pads. In these embodiments, the method or the system may use various database technologies to manipulate the transaction.

The method or the system may perform the modification process on the geometric shape to generate one or more changes to the geometric shape and store the one or more changes or other data related to the one or more changes in the one or more scratch pads in some embodiments. In some embodiments, the method or the system provides interactive feedback to the user during the performance of the modification process. In these embodiments, the method or the system further identifies or determines a rate of change of the geometric shape. In some embodiments, the method or the system may identify or determines a threshold rate of change of the geometric shape where the method or the system ignores certain changes when the rate of change of the geometric shape exceeds the threshold rate of change. In some embodiments, the method or the system may identify or determine a polling frequency to identify the one or more changes to the geometric shape during the modification process based on the polling frequency. For example, the method or the system may capture the changes in the geometric shape once every fixed period of time. In some embodiments, the one or more changes of the geometric shape may comprise, for example but not limited to, a change in the location, size, shape, orientation, or even existence of the geometric shape.

The method or the system may also include a call-back mechanism where the method or the system may first identify one or more triggers and associate one or more priority levels with the one or more triggers in some embodiments. The method or system may then call at least some of the one or more triggers during the performance of the modification process based at least in part upon the one or more priority levels.

For example, the method or the system may identify the first trigger to be one that determines whether a change corresponds to some existing nodes in the electronic design that have been analyzed to be DRC clean. The method or the system may further identify the second trigger to be one that causes the method or the system to skip the design rule checking process where it is determined that the change corresponds to some existing nodes that have been analyzed to be DRC clean. The method or the system may also identify a third trigger to be one that determines whether or not to snap the geometric shape or the change to an existing node that has been analyzed to be DRC clean if the change is determined not to correspond to any nodes that have been analyzed to be DRC clean. In some embodiments, the method or the system invokes the third trigger to snap at least some of the one or more changes to the geometric shape to some existing nodes so as to reduce the amount of data that need to be processed or to increase the efficiency or speed of the entire process. In some embodiments, the method or system does not snap the one or more changes to some existing nodes and performs the design rule checking process anew.

In some embodiments, the method or the system may then determine whether one or more design rules or constraints are satisfied during the performance of the modification process and provide the results of the determination to the user in an interactive or nearly real-time manner during the modification process. For example, a user may drag a geometric shape around in the physical design of the electronic design. The method or the system may identify various design rules or constraints related to the geometric shape or its surrounding shapes within a certain range and determine whether these various design rules or constraints are satisfied while the user is moving the geometric shape. The method or the system may present the results of the determination by using textual indications, graphical indications, or a combination of textual and graphical indications interactively or in a nearly real-time manner. For example, the method or the system may draw one or more halos with the option of showing textual information of a multi-body spacing constraint around a static shape when the user moves a moving shape within certain proximity of the static shape to notify that the moving shape is approaching or is actually encroaching upon an area that is required by the multi-body spacing constraint.

In some embodiments, the method may include the process of identifying an object from a layout of the electronic design, the process of performing a modification process on the object, the process of determining whether a relevant constraint is satisfied, and the process of displaying a result of the act of determining whether the relevant constraint is satisfied. In some embodiments, the process of performing the modification process may include the process of identifying or determining a data capture process for the modification process, the process of identifying a change to the object based at least in part upon the data capture process, wherein the change arises out of the modification process, and the process of storing the change in a scratch pad, where the process of identifying the data capture process may further include the process of identifying or determining a static data capture process, the process of identifying a first set of one or more attributes of the object at a first time instant of the modification process, the process of identifying a second set of one or more attributes of the object at a second time instant of the modification process, and the process of identifying or determining the change to the object based at least in part upon the first set of one or more attributes and the second set of one or more attributes.

In some embodiments, the process of identifying or determining the change may include the process of comparing the first set of one or more attributes with the second set of one or more attributes to determine the change. In some embodiments, the process of identifying the data capture process may include the process of identifying a dynamic data capture process, the process of monitoring an object characteristic of the object or a process characteristic of the modification process, and the process of identifying a threshold rate of change or a sampling frequency for the dynamic data capture process. In some embodiments, the process of identifying the data capture process may further include the process of identifying a first set of one or more attributes of the object by using the dynamic data capture process based at least in part upon the threshold rate of change or the sampling frequency, the process of monitoring a second set of one or more attributes of the object based at least in part upon the threshold rate of change or the sampling frequency, and the process of identifying the change by using at least the first set of one or more attributes and the second set of one or more attributes.

In some embodiments, the method may further include the process of creating one or more snapshots or maintaining one or more log records of a design database of the electronic design, the process of implementing the modification process as a database transaction, and the process of identifying or creating a scratch pad for the transaction. In these embodiments, the process of determining whether the relevant constraint is satisfied may further include the process of undoing the transaction by using the one or more snapshots or the one or more log records based on a criterion, and the process of displaying the result may further include the process of generating one or more indicators based at least in part upon the result of the act of determining whether the relevant constraint is satisfied. In some embodiments, the method may optionally include the process of determining whether the relevant constraint is satisfied during performance of the modification and before the modification process is complete, and the process of displaying the result of the act of determining whether the relevant constraint is satisfied during the performance of the modification process and before the modification process is complete.

In some embodiments, the method may optionally include the process of identifying or determining a final change that is to be implemented for the object, the process of updating data or information in a scratch pad based at least in part upon the final change, and the process of implementing the final change for the object in the layout without committing the final change in a persistently stored design database of the electronic design. In some of these embodiments, the method may further include the process of performing a post-modification check on at least a portion of the layout including the object after the modification process is complete and the process of committing data or information related to the final change in the scratch pad to the persistently stored design database.

In some embodiments, the process of identifying or creating a scratch pad may include the process of associating the scratch pad with the layout, the process of setting up the scratch pad to communicate with the design database, the process of populating the scratch pad with data or information from the design database, the process of identifying another scratch pad that does not share one or more resources with the scratch pad, and the process of linking the another scratch pad with the scratch pad for exchange of data or information, where the process of populating the scratch pad may include the process of populating the another scratch pad with the data or information or other data or information from the design database.

In some embodiments, the process of performing the modification process on the object may include the process of applying one or more modifications defined by the modification process to the object, the process of identifying a threshold rate of change, the process of identifying a rate of change of data or one or more characteristics of the object based at least in part upon the threshold rate of change, the process of determining a relation between a current rate of change of the object and the threshold rate of change, the process of identifying one or more triggers, the process of associating one or more priority levels with the one or more triggers, and the process of invoking at least one trigger of the one or more triggers according to the one or more priority levels to perform one or more functions associated with the at least one trigger during the performance of the modification process based at least in part upon the one or more characteristics of the object or upon the rate of change.

In some embodiments, the process of invoking the at least one trigger may include the process of identifying one or more nodes in the layout that have been analyzed to be correct and the process of applying the at least one trigger to determine whether a change in the object resulting from the modification process corresponds to at least one node of the one or more modes. In these embodiments, the process of invoking the at least one trigger may include the process of snapping the object to the at least one node, wherein the process skips a determination of whether the relevant constraint is satisfied.

In some embodiments, the process of determining whether the relevant constraint is satisfied may include the process of analyzing the modification process to determine a range of influence, the process of identifying one or more neighboring objects within the range of influence, and the process of identifying the relevant constraint or one or more other relevant constraints that are associated with the one or more neighboring objects. In some of these embodiments, the process of determining whether the relevant constraint is satisfied may further include the process of identifying one or more target objects form the one or more neighboring objects, the process of identifying a primary object from one or more dynamic objects, from one or more target objects, or from one or more other objects.

object from the one or more sources, the process of determining whether the relevant constraint or the one or more other relevant constraints are satisfied by checking a first relation between the object and the one or more target objects or a second relation between the primary object and the one or more targets, where the process of displaying the result of the act of determining whether the relevant constraint is satisfied may include the process of transforming the determination result into a set of primitives and the process of constructing the result for the action of displaying the result by using at least the set of primitives.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for implementing electronic circuit designs with electro-migration awareness in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are a method, a system, and an article of manufacture for implementing interactive, real-time checking or verification of constraints. Various embodiments bridge schematic design environment and layout environment with a binder mapping process and utilize connectivity information from the schematic design to identify constraint violations early in the physical design stage. The method identifies or creates a layout and identifies or generates an object for a modification process. The method may take snapshot(s) of the design database or may use one or more logs for restoring the design database. The method then identifies or creates scratch pad(s) and performs modification process on the object to generate a change. The method uses scratch pad(s) and trigger(s) to perform constraint checking during the modification process to provide interactive feedback in response to the modification process before committing the change to the persistent database.

Figure 1:
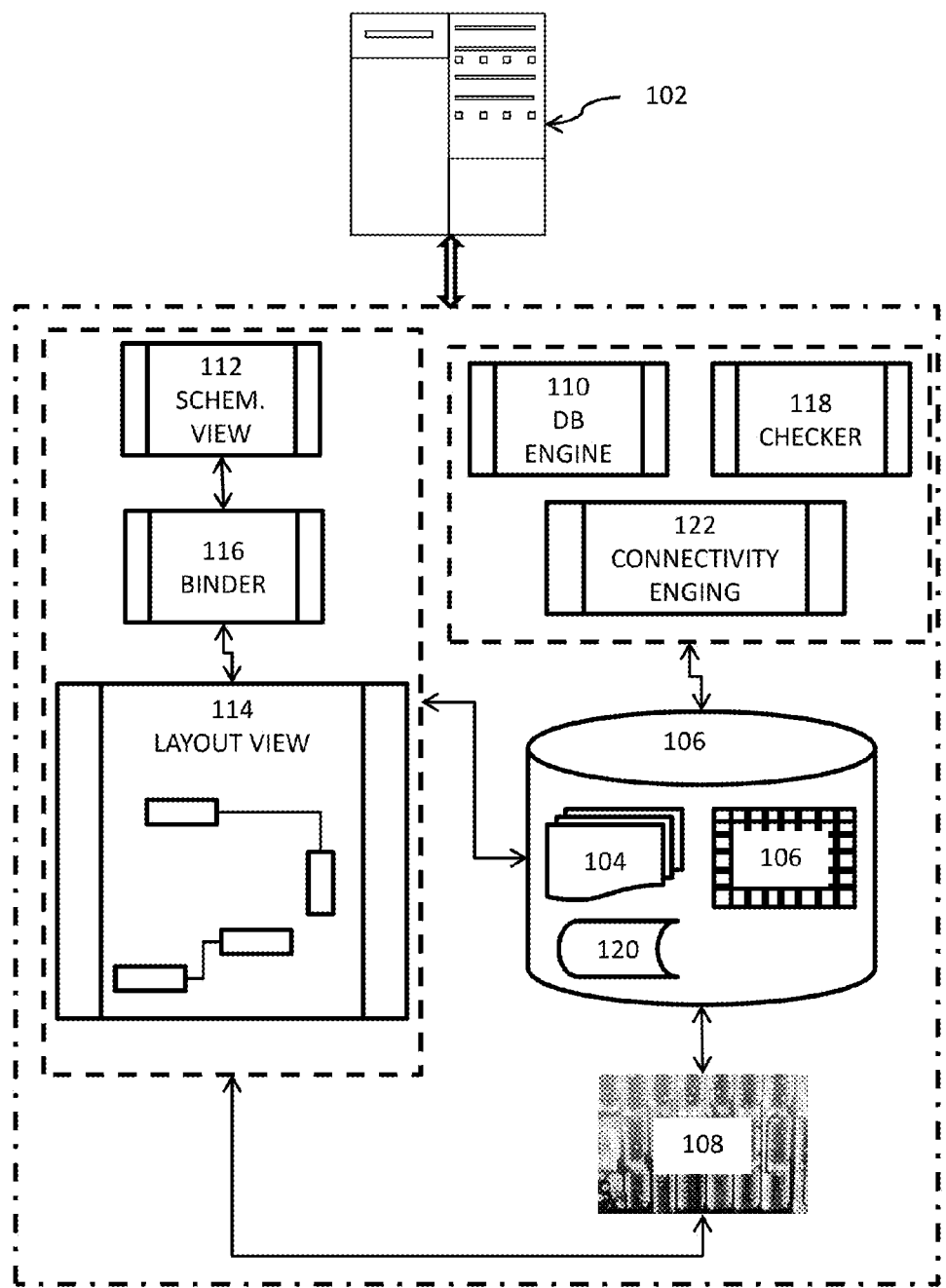
FIG. 1 illustrates a high level block diagram for implementing interactive, real-time checking or verification of constraints in some embodiments.

FIG. 1 illustrates a high level block diagram for implementing interactive, real-time checking or verification of constraints in some embodiments. In one or more embodiments, a designer may use one or more computing systems 102 to perform various processes or to invoke various hardware modules to create or manipulate an electronic design. The one or more computing systems 102 may comprise various electronic design tools such as, but not limited to, a schematic editor, a schematic simulator, a physical design tool, a physical design analysis engine, etc. The one or more computing system 102 may further initiate or interact with a schematic view 112 and a layout view 114 of an electronic design in some embodiments.

In some embodiments, the layout view of an electronic design includes a partial, incomplete physical design that contains only a smaller portion of the physical design. For example, the partial, incomplete physical design may contain only a single object that represent a single electronic design component, a net, or a portion thereof. The layout view 114 and the schematic view 112 may be bound together to allow communication of data or information between the two views of the electronic design with a binder mapping process or module 116. The one or more computing system 102 may also initiate or interact with a database engine 110 to, for example, perform or undo one or more transaction or maintaining one or more log records (e.g., undo logs, redo logs, state logs, etc.) in some embodiments.

The one or more computing system 102 may also initiate or interact with a checker 118, such as a physical verification process or module or a design rule checking process or module in some embodiments. The one or more computing system 102 may also initiate or interact with a connectivity engine 122 which performs the functions of, for example, receiving, updating, removing, or adding connectivity information, or maintaining other data or information about the connectivity information. Various embodiments use the connectivity information to keep track of which net a design component belongs to in an electronic circuit design. The one or more computing system 102, the processes or modules 110, 118, and 122, and the session for the schematic view design 112, the session for the layout view design 114, or the binder mapping process or module 116 may also initiate or interact with a non-volatile, non-transitory computer accessible medium 106 and a volatile, non-transitory computer accessible medium 108 to read data or information from or write data or information to these non-transitory computer accessible media.

In some embodiments, the non-volatile, non-transitory computer accessible medium 106 may store thereupon data or information that comprises, for example but not limited to, one or more rule decks 104 for various design rules, constraints, requirements, or goals (collectively constraint or constraints), one or more data structures 106 (e.g., database tables, lists, tables, trees, graphs, etc.), connectivity information, standard or custom libraries, or any other data 120 that are needed or desired for the performance of various processes disclosed herein. In some embodiments, the non-transitory volatile computer accessible medium 108 may store thereupon data or information that comprises, for example but not limited to, temporary data, uncommitted transaction data, temporary values of one or more variables or states of various processes or modules, etc. The one or more computing system 102 may also invoke a user interface to interact with a display apparatus (not shown) to provide interactive or nearly real-time feedback to a user.

Figure 2:
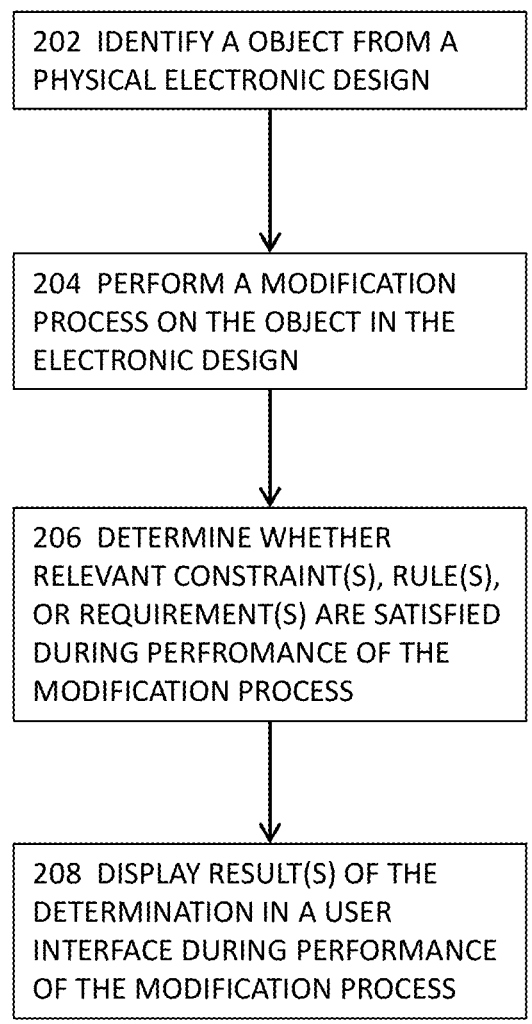
FIG. 2 illustrates a high level flow diagram for a method or a system for implementing interactive, real-time checking or verification of constraints in some embodiments.

FIG. 2 illustrates a high level flow diagram for a method or a system for implementing interactive, real-time checking or verification of constraints in some embodiments. In one or more embodiments, the method or system for implementing interactive, real-time checking or verification of constraints may comprise the respective process or module 202 of identifying an object from a physical electronic design. In some embodiments, an object identified at 202 may comprise an electronic design component such as a geometric shape, an interconnect, a net, etc. Such an identified object will be stored as an object of a class as in object-oriented programming which comprises a variable comprising both routings and data that is treated as a discrete entity. In some of these embodiments, the object identified at 202 comprises a target object in the physical electronic circuit design against which a constraint will be checked.

In some embodiments, the constraint checking process performs the checks of various constraints only against the targets which may also be called static objects in the physical design. In some embodiments, the constraint checking process performs various checks of various constraints against the identified target and also against one or more other objects, which have not been identified as the targets. Nonetheless, the constraint checking process may assign higher priority to the identified target in checking the constraints. In these embodiments, a static object represents an object, which is not currently undergoing some modification process, in an electronic design.

In some embodiments where the method or the system identifies multiple objects at 202, the method or the system may identify one or more of these multiple objects as the target. It shall be noted that a target may be identified or designated at any time in some embodiments. For example, the method or system allows a designer to designate any shape as a target at any time by using, for example but not limited to, a point device, a menu command, a hot key or a combination of key strokes, a bind key, etc. A designer may even identify or designate one or more objects as targets when one or more constraints are being checked in some embodiments.

In one or more embodiments, the method or system for implementing interactive, real-time checking or verification of constraints may comprise the respective process or module 204 of performing a modification process on the object in the electronic design. In some embodiments, a modification process for an object includes, for example but not limited to, translation, rotation, mirroring, resizing, deformation, change(s) in configuration (e.g., number of fingers of a CMOS device), etc. In these embodiments, the object on which the modification process is performed may also be called a dynamic object to signify that the object is undergoing some modifications.

In one or more embodiments, the method or system for implementing interactive, real-time checking or verification of constraints may comprise the respective process or module 206 of determining whether one or more relevant constraints are satisfied with respect to the object and the target or one or more other objects to which one or more relevant constraints apply. In some embodiments, the method or the system determines whether one or more relevant constraints are satisfied when the modification process is being performed on the object. In some embodiments, the one or more relevant constraints comprise a complex constraint involving multiple objects (e.g., geometric shapes, interconnects, nets, etc.), a net-based constraint (e.g., a net-to-net spacing constraint), a constraint whose values are defined by a data structure (e.g., a table) instead of a single value (e.g., a voltage-based constraint that imposes different, for instance, different spacing values for different operating voltages or a spacing constraint depending upon parallel run-lengths between two adjacent objects), a corner-to-corner constraint between two adjacent objects in addition to the spacing constraint between these two object, etc.

In one or more embodiments, the method or system for implementing interactive, real-time checking or verification of constraints may comprise the respective process or module 208 of displaying results of the action of determining whether the one or more relevant constraints are satisfied in a user interface. In some embodiments, the method or the system displays results of the action of determining whether the one or more relevant constraints are satisfied in a user interface during the performance of the modification process. In these embodiments, the method or the system provide the results of the constraint checking interactively in response to, for example, one or more operations of the modification process. In some embodiments, the method or the system displays results of the action of determining whether the one or more relevant constraints are satisfied in a user interface in a nearly real-time manner.

In some embodiments, being in real-time includes the scenarios where certain operations (e.g., checking a constraint against an object) are relating to a time frame that is imposed by external constraints, and the response of a system for these certain operations matches a user's perception of time or proceeds at the same rate as a physical or external process. Nonetheless, it is also understood that any operations on a computing system may take certain period of time, which may vary from a few nano-seconds to some extended period of time. For example, it may take the system a split of a second to check a constraint multiple objects. Nonetheless, the aforementioned "in nearly real-time" refers to the fact that the system may still need a period of time to complete the constraint checking while the object is being created or modified in an electronic circuit design, although this period of time may not even be perceptible by a human designer or user.

In some embodiments, the method or the system may display the results in a graphical form, a textual form, or a combination thereof. In some embodiments, the method or the system may display the results in a form of hints by using one or more graphical symbols or marks, one or more textual representations, or a combination thereof based at least in part upon the relative position of the dynamic object in relation to one or more static objects or the target. For example, if the method or the system determines that the dynamic object is within some prescribed proximity of the target or one or more static objects, the method or the system may display, for example, one or more halos around the static object, the target, or the dynamic object with some textual indications showing the values of constraints as indicated by the one or more halos. In these embodiments, the method or the system displays results before, after, or at the time the one or more relevant constraints are breached.

In some embodiments, the method or system may further determine the projected state for the object arising out of the modification process and adjust the display of the results accordingly. For example, if the method or the system determines that the projected state (e.g., a projected path) of the dynamic object does not encroach upon the prohibited space (e.g., a space where a violation the one or more relevant constraints occurs when the space is encroached upon) of the target or of one or more other static objects in any direction, the method or the system may use the direction that allows for larger display area to display the results in some embodiments.

Figure 2A:
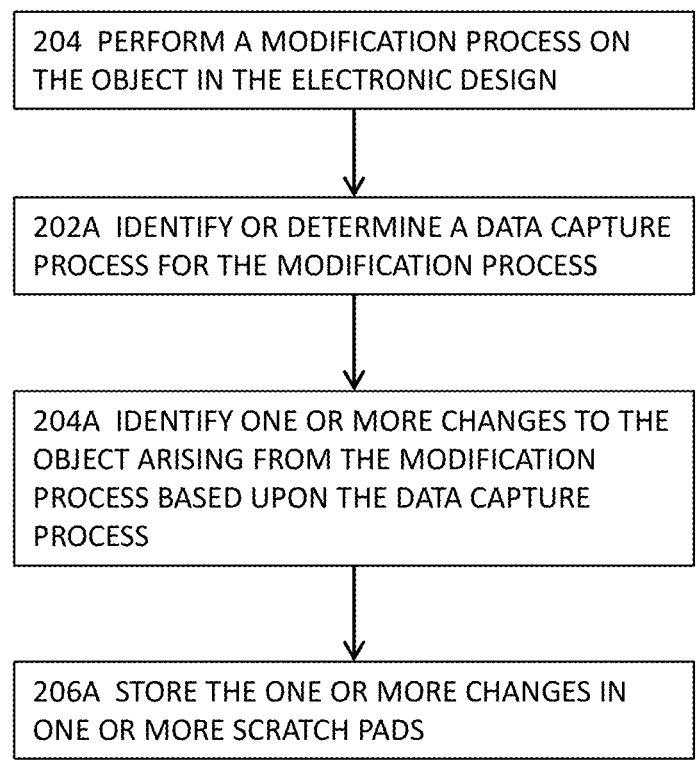
FIG. 2A illustrates more details about the process or module 204 illustrated in FIG. 2 for performing a modification process on the object in the electronic design in some embodiments.

FIG. 2A illustrates more details about the process or module 204 illustrated in FIG. 2 for performing a modification process on the object in the electronic design in some embodiments. In some embodiments, the process or module 204 for performing a modification process on the object comprises the sub-process or sub-module 202A of identifying or determining a data capturing or acquisition process for the modification process. In some embodiments, the process or module 204 for performing a modification process on the object comprises the sub-process or sub-module 204A of identifying one or more changes to the object that arise from the modification process based at least in part upon the data capturing or acquisition process.

For example, the process or module 202A may determine to capture data at some fixed time points, such as the final location of the object where the object is finally dropped while ignoring all the interim locations when the object is moved from an initial location to the final location. As another example, the process or module 202A may alternatively determine to capture data when the object is being moved by sampling data about the object at a plurality of time points. More details about the data capturing or acquisition process will be provided below with reference to FIG. 2B. In some embodiments, the process or module 204 for performing a modification process on the object comprises the sub-process or sub-module 206A of storing the one or more changes in one or more scratch pads.

In some embodiments, a scratch pad comprises one or more blocks of a non-transitory volatile computer accessible medium (e.g., random access memory or RAM) for temporarily storing data or information thereupon. In some embodiments, all the processes, modules, and tools (e.g., the schematic design tool, a physical design tool, a constraint verification tool, etc.) share one or more scratch pads along with other resources such as the design databases. In some other embodiments, a process, module, or tool may have its own one or more scratch pads for storing thereupon various data or information temporarily, while some other processes, modules, or tools share one or more other scratch pads along with other resources. In some embodiments, each process, module, and tool has its own one or more dedicated scratch pads.

Figure 2B:
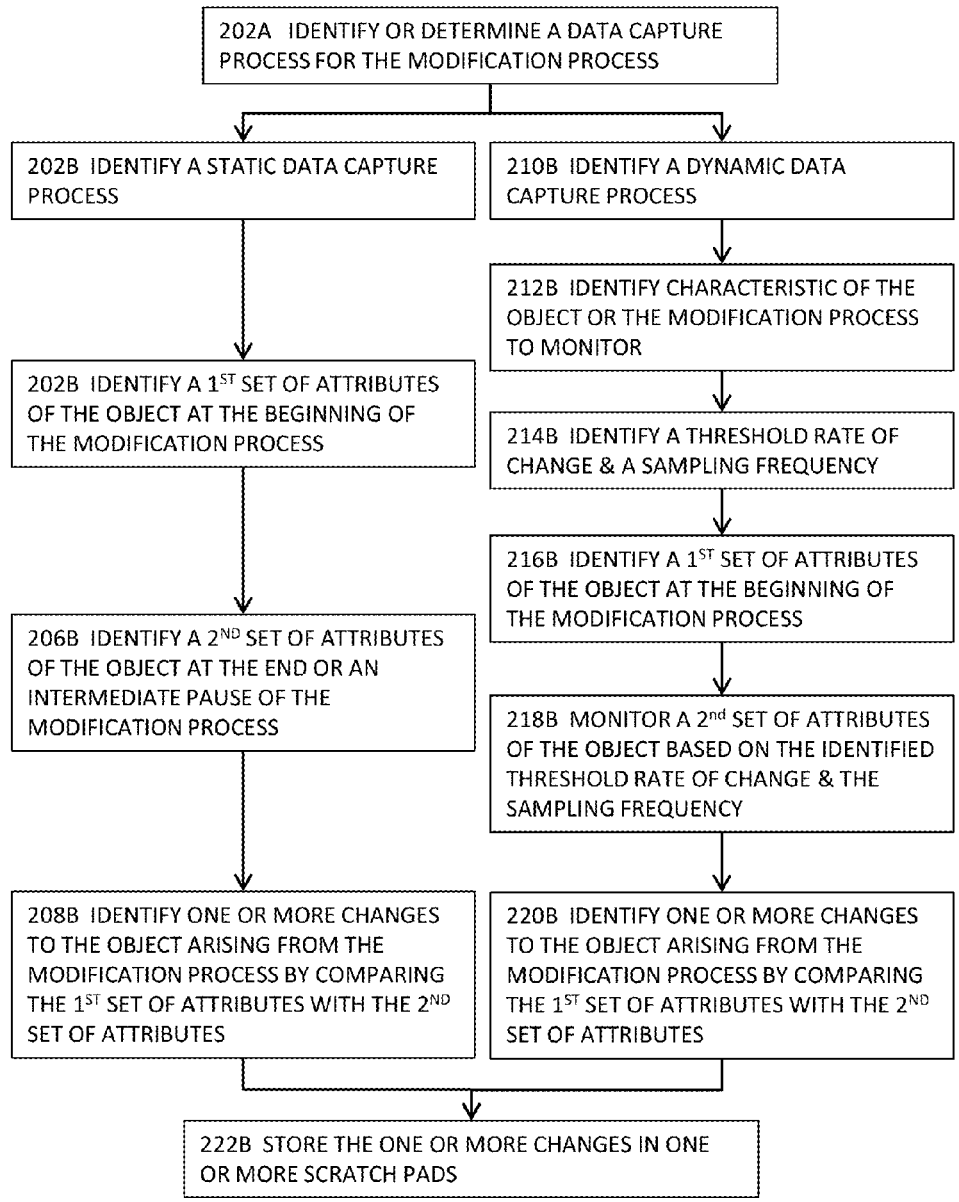
FIG. 2B illustrates more details about the process or module 202A illustrated in FIG. 2A for identifying or determining a data capture process for the modification process in some embodiments.

FIG. 2B illustrates more details about the process or module 202A illustrated in FIG. 2A for identifying or determining a data capture process for the modification process in some embodiments. In some embodiments, the process or module 202A for identifying or determining a data capturing or acquisition process or module comprises the sub-process or sub-module 202B for identifying a static data capturing process or module. In these embodiments, the process or module 202A may further comprise the sub-process or sub-module 204B for identifying a first set of attributes of the object at the beginning of the modification process.

For example, the process or module 204B may identify the initial location of the object at the beginning of a moving process that moves the object from the initial location to a final location. In this example, the first set of attributes of the object may comprise the coordinates of the initial location in the physical design space. In these embodiments, the process or module 202A may further comprise the sub-process or sub-module 206B for identifying a second set of attributes of the object at the end or one or more intermediate pauses of the modification process. In the above example, the process or module 206B may identify the final location (or one or more intermediate locations of the object when the object temporarily stops at these intermediate locations) of the object. In this example, the second set of attributes comprise the coordinates of the final location of the object in the physical design space.

In these embodiments, the process or module 202A may further comprise the sub-process or sub-module 208B for identifying one or more changes to the object that arise from the modification process. In these embodiments, the sub-process or sub-module 208B may identify the one or more changes by comparing the first set of attributes with the second set of attributes. In the above example, the one or more changes includes the changes in the coordinates of the object. In the alternative, the process or module 202A for identifying or determining a data capturing or acquisition process or module comprises the sub-process or sub-module 210B for identifying a dynamic data capturing process in some embodiments.

In some embodiments, the process or module 202A for identifying or determining a data capturing or acquisition process or module comprises the sub-process or sub-module 2128 for identifying one or more characteristics of the object or the modification process for monitoring purposes. In some embodiments, the one or more characteristics may comprise the rate of change of the object by the modification process. In some embodiments where the modification process includes moving the object, the one or more characteristics comprise the speed at which the object is being moved. the process or module 202A for identifying or determining a data capturing or acquisition process or module optionally comprises the sub-process or sub-module 214B for identifying a threshold rate of change or a sampling frequency for acquiring or capturing the data about the object.

The sub-process or sub-module 214B may, for example, acquire data every fixed period of time based on the sampling frequency in some embodiments. In some embodiments, the sub-process or sub-module 214B ignores all the locations when the rate of change of the object exceeds the threshold rate of change. In the previous example, the sub-process or sub-module 214B ignores all the locations of the object when the object is being moved if the threshold rate of change is set to zero. If the threshold rate of change comprises a non-zero value, the sub-process or sub-module 214B ignores all the locations of the object when the object is being moved at a speed higher than the threshold rate of change.

In some embodiments, the process or module 202A for identifying or determining a data capturing or acquisition process or module comprises the sub-process or sub-module 2168 for identifying a firs set of attributes of the object at the beginning of the modification process. In the previous example, the sub-process or sub-module 2168 may identify the initial location of the object at the beginning of the modification process that adjusts the placement of the object. The first set of attributes may comprise, for example but not limited to, a location, size, length, width, orientation, shape, configuration, etc. of the object at a point in the modification process in some embodiments. In some embodiments where the object is being created for the first time in the physical design, the process or module 202A may identify the location of the object where the object is first introduced into the physical design.

In some embodiments, the process or module 202A for identifying or determining a data capturing or acquisition process or module comprises the sub-process or sub-module 218B for identifying a second set of attributes for the object based at least in part upon the threshold rate of change or the sampling frequency. The second set of attributes may comprise, for example but not limited to, a location, size, length, width, orientation, shape, configuration, etc. of the object at a point in the modification process in some embodiments. In some embodiments, the process or module 202A for identifying or determining a data capturing or acquisition process or module comprises the sub-process or sub-module 220B for identifying one or more changes to the object that arise out of the modification process. In some embodiments, the sub-process or sub-module 220B identifies the one or more changes to the object by comparing the first set of attributes with the second set of attributes. In both approaches, the process or module 202A may then proceed to 222B to store the one or more changes in one or more scratch pads.

Figure 3:
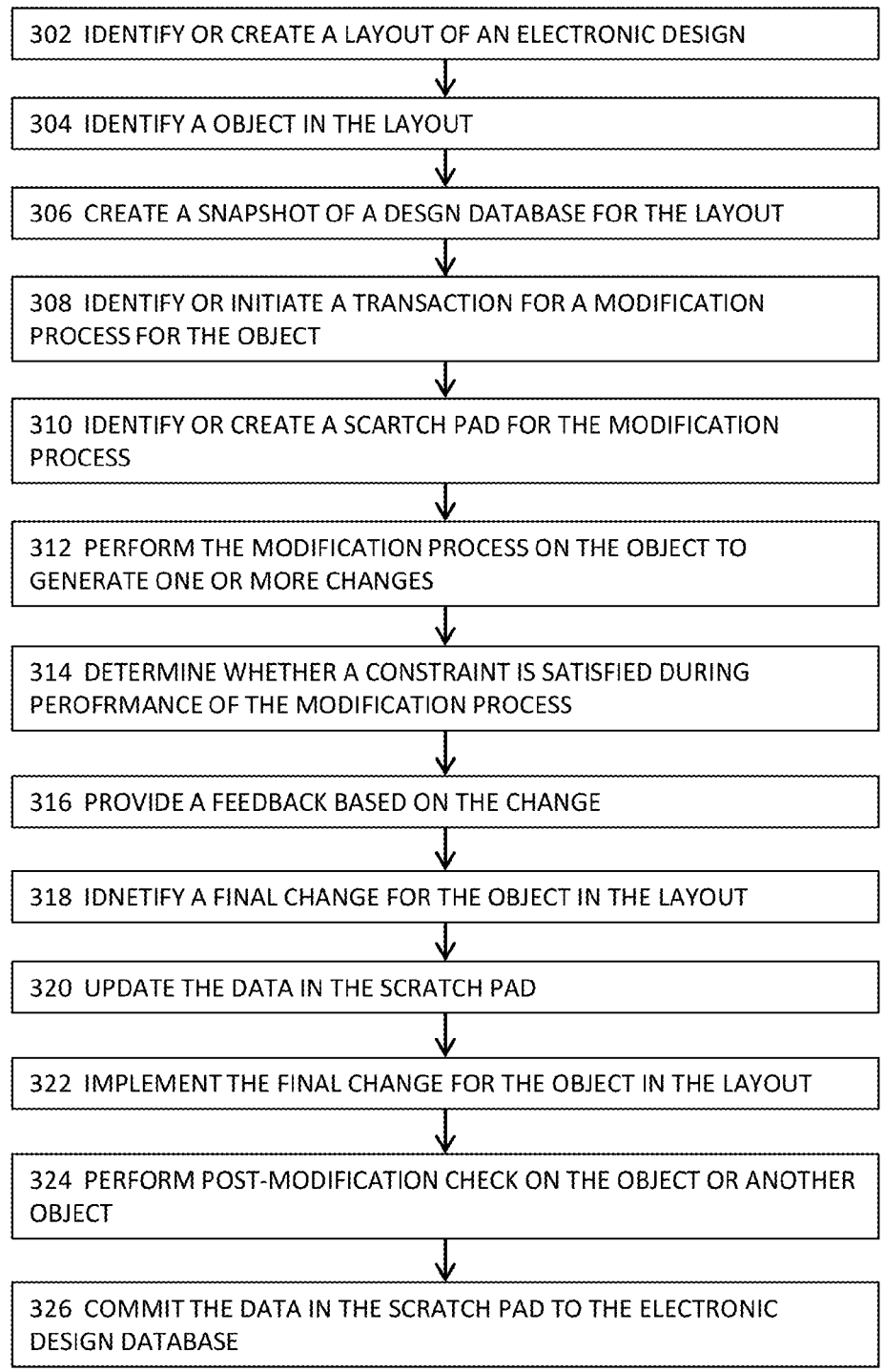
FIG. 3 illustrates more detailed flow diagram for implementing interactive, real-time checking or verification of constraints in some embodiments.

FIG. 3 illustrates more detailed flow diagram for implementing interactive, real-time checking or verification of constraints in some embodiments. In one or more embodiments, the method or system for implementing interactive, real-time checking or verification of constraints may comprise the respective process or module 302 of identifying or creating a layout of an electronic design. In some embodiments, the layout may comprise a partial, incomplete layout which may include, for example, only a single net or a part thereof, or one or more components, but not all, of a single net. In some embodiments, the method or system for implementing interactive, real-time checking or verification of constraints may comprise the respective process or module 304 of identifying an object in the layout. An object may comprise, for example but not limited to, a geometric shape, an interconnect or a portion thereof, a cell instance, or a smaller portion of the electronic circuit design, etc. in some embodiments.

In some embodiments, the method or system for implementing interactive, real-time checking or verification of constraints may comprise the respective process or module 306 of creating a snapshot of a design database for the layout that is being manipulated. In some embodiments, the method or the system may create a snapshot of one or more design databases at a certain point in time before performing other processes or invoking other modules described herein to preserve the states of these one or more design databases. In the cases when some additional editing or modifications cause issues with the one or more databases, the method or the system may use the snapshot of the one or more databases to restore the one or more databases to some prior states.

In addition or in the alternative, the method or the system may further maintain one or more log records, such as one or more undo logs, one or more redo logs, one or more state logs to keep track of the modifications made to the one or more design databases. In the event of certain modifications causing some undesired changes to any of the one or more databases, the method or the system may also use the one or more log records to restore the one or more databases to a desired point in time by applying at least some of these log records to the one or more databases. In addition or in the alternative, the method or the system may implement one or more temporal databases in which one or more pieces of data for a database objects are stored at one or more different time points. In the event of certain modifications causing some undesired changes to the electronic design, the method or the system may identify one or more known, good pieces of data and refresh the current data of the one or more databases with these one or more known, good pieces of data.

In some embodiments, the method or system for implementing interactive, real-time checking or verification of constraints may comprise the respective process or module 308 of identifying or initiating a transaction for a modification process for the object. In some embodiments, the method or the system may implement the process as a database transaction that comprises a single, logical operation on the data of the one or more databases and observes the ACID (atomicity, consistency, isolation, and durability) properties to guarantee the modification process is processed reliably. In these embodiments, the method or the system or the designer may determine whether or not the outcome of the modification is to be committed or scratched by using various database techniques. In the event that certain modifications cause some undesired effects, the method or the system may undo the modification process by using some database techniques to preserve the integrity, reliability, or stability of the one or more databases.

In some embodiments, the method or system for implementing interactive, real-time checking or verification of constraints may comprise the respective process or module 310 of identifying or creating one or more scratch pads for a modification process. In some embodiments, a scratch pad comprises one or more blocks of a non-transitory volatile computer accessible medium (e.g., random access memory or RAM) for temporarily storing data or information thereupon. In some embodiments, all the processes, modules, and tools (e.g., the schematic design tool, a physical design tool, a constraint verification tool, etc.) share one or more scratch pads along with other resources such as the design databases. In some other embodiments, a process, module, or tool may have its own one or more scratch pads for storing thereupon various data or information temporarily, while some other processes, modules, or tools share one or more other scratch pads along with other resources.

In some embodiments, each process, module, and tool has its own one or more dedicated scratch pads. In some embodiments, the method or the system may further comprise the process or module of populating at least a part of the one or more databases of the layout in at least some of the one or more databases of the electronic design such that various processes or module may access the design data from the one or more scratch pads. In these embodiments including the process or module 310, the method or the system may perform various operations on the data in the electronic design completely within the one or more scratch pads such that the persistent data in the one or more databases of the electronic design may be preserved. In some embodiments, the method or system for implementing interactive, real-time checking or verification of constraints may comprise the respective process or module 312 of performing the modification process on the object to generate one or more changes in the layout.

In some embodiments, a modification process for an object includes, for example but not limited to, translation, rotation, mirroring, resizing, deformation, change(s) in configuration (e.g., number of fingers of a CMOS device), etc. In these embodiments, the one or more changes include one or more changes in the location, orientation, size, shape, or configuration of the object arising out of the modification process. In some embodiments, the method or system for implementing interactive, real-time checking or verification of constraints may comprise the respective process or module 314 of determining whether a constraint is satisfied.

In some embodiments, a constraint may comprise, for example but not limited to, a voltage-based constraints that imposes different, for example, spacing requirements between the first net and other net(s) based on the operating voltages, a net-based constraint that imposes some restrictions or limitations on two or more nets, a connectivity based constraint that needs not only the geometric characteristics of one or more shapes in a layout but also the connectivity information of these one or more shapes to determine whether the connectivity-based constraint is satisfied, a constraint defined by a list of permissible values rather than a single value (e.g., a spacing rule defined by a table of values based on, for example, parallel run-lengths), a constraint involving multiple shapes and multiple geometric characteristics of each of these multiple shapes (e.g., a constraint imposing a spacing requirements between two adjacent shapes as well as corner-to-corner requirements between these two adjacent shapes), etc.

In some embodiments, the method or the system determines whether a constraint is satisfied during the performance of the modification process on the object. In other words, the method or system performs one or more checks to determine whether the constraint is satisfied in nearly real-time while the modification process is being performed on the object. In some embodiments, the method or system for implementing interactive, real-time checking or verification of constraints may comprise the respective process or module 316 of providing a feedback for the one or more changes. In some embodiments, the feedback may comprise a hint or a recommendation for how to address or resolve some negative effects (if any) arising out of the one or more changes.

In some embodiments, the feedback may be presented to a designer via a user interface. With the nearly real-time determination of whether a constraint is satisfied, the method or system may thus provide an interactive response to a modification process on the layout in a nearly real-time manner. In some embodiments, the method or system for implementing interactive, real-time checking or verification of constraints may comprise the respective process or module 318 of identifying a final change for the object in the layout. In some embodiments, the method or system may identify such a final change for the object based at least in part upon the feedback provided at 316.

For example, if a modification process attempts to place an object or to change the location of the object to a candidate location which may cause some issues with the layout, the method or process may recommend another location within certain proximity of the candidate location as the final location. As another example, the method may, depending upon the candidate location regardless of whether or not this candidate location may cause some issues, recommend another location within certain proximity of the candidate as the final location if the another location has previously been analyzed to constitute a good design. In either examples, the method may automatically place the object at the another location or may await a designer's approval for the another location.

In some embodiments, the method or system for implementing interactive, real-time checking or verification of constraints may comprise the respective process or module 320 of updating the data in the scratch pad based at least in part upon the final change. In these embodiments, the method or system make all modifications to the data or information in the one or more scratch pads without contaminate the persistent design database(s). In some embodiments, the method or system for implementing interactive, real-time checking or verification of constraints may comprise the respective process or module 322 of implementing the final change for the object in the layout.

In some embodiments, the method or system for implementing interactive, real-time checking or verification of constraints may optionally comprise the respective process or module 324 of performing a post-modification check on the object or on other portion of the layout to determine whether or not the implemented modification process with the final change complies with one or more constraints of the electronic design. These one or more constraints may include, for example, a constraint involving multiple shapes and multiple geometric characteristics of each of these multiple shapes (e.g., corner-to-corner design rules), and a constraint involving multiple nets (e.g., a net-to-net design rule), a constraint based on voltages, or a constraint defined by a list of permissible values, rather than a single value (e.g., a spacing constraint defined by a table of values based on, for example, parallel run-lengths). In some embodiments, the method or system for implementing interactive, real-time checking or verification of constraints may comprise the respective process or module 326 of committing the data in the one or more scratch pads to the electronic design database(s).

Figure 4:
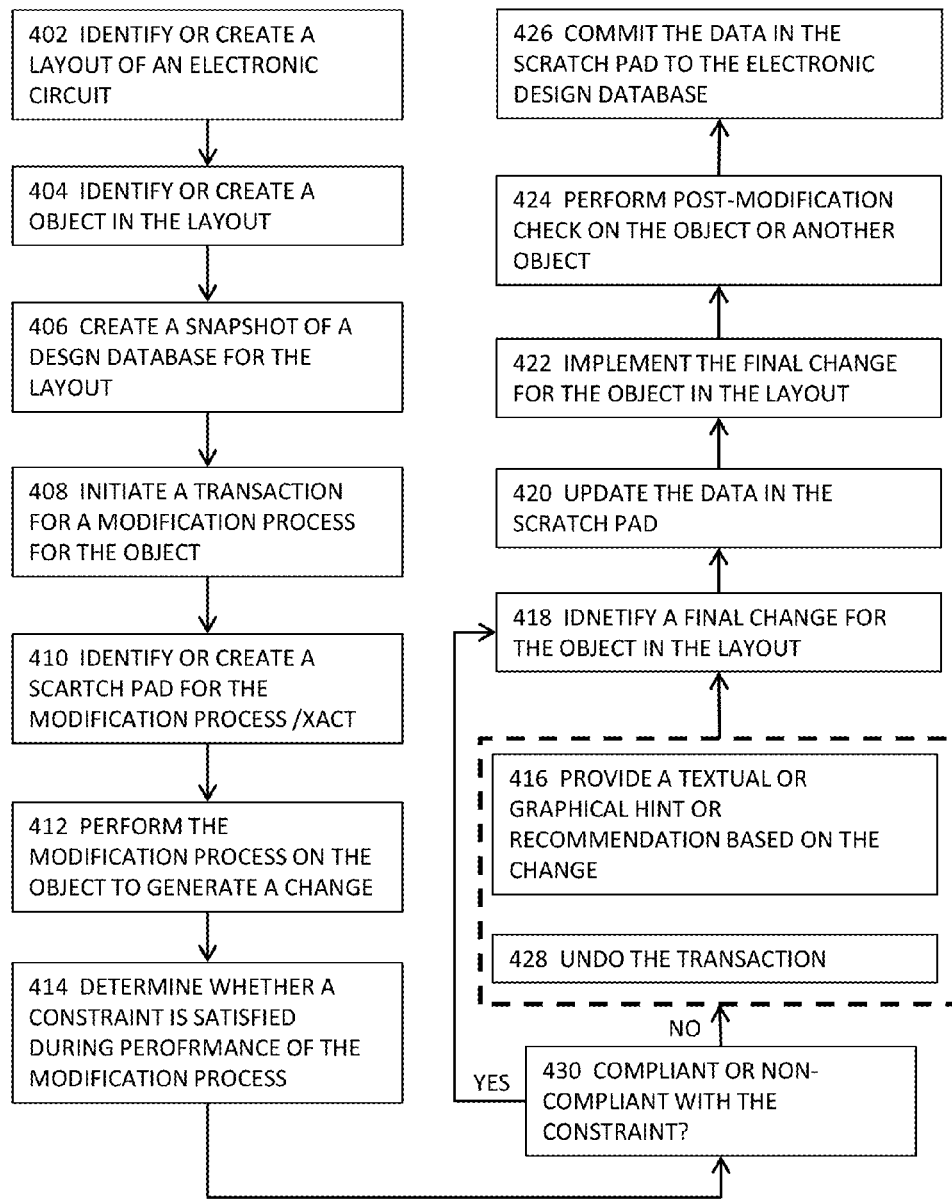
FIG. 4 illustrates more detailed flow diagram for implementing interactive, real-time checking or verification of constraints in some embodiments.

FIG. 4 illustrates more detailed flow diagram for implementing interactive, real-time checking or verification of constraints in some embodiments. In some embodiments, the method or system for implementing interactive, real-time checking or verification of constraints may comprise the respective process or module 402 of identifying or creating a layout of an electronic circuit. In some of these embodiments, the layout needs not exist when the method or the system initializes. In these embodiments, various processes or modules described herein still perform their respective functions to achieve the intended purpose even when the layout is being created for the first time. In some of these embodiments where the layout already exists, the method or system may also perform various functions to achieve the intended purposes even with a partial, incomplete layout.

In some embodiments, the method or system for implementing interactive, real-time checking or verification of constraints may comprise the respective process or module 404 of identifying or creating an object in the layout. In some embodiments, the method or system for implementing interactive, real-time checking or verification of constraints may comprise the respective process or module 406 of creating one or more snapshots of one or more design databases for the electronic design or for the layout. In some embodiments, the method or system for implementing interactive, real-time checking or verification of constraints may comprise the respective process or module 408 of initiating a database transaction for a modification. In some of these embodiments, a transaction may comprise a nested-transaction that include multiple transactions in a hierarchical architecture.

For example, a higher level transaction in the transaction initiated may invoke one or more lower level transactions within the higher level transaction and complete these one or more lower level transactions to obtain desired data or information with the option of undoing these one or more lower level transactions before continuing with the remainder of the higher level transaction. In an event where the identified transaction needs to be undone, the method or the system starts from the lowest level of the transaction hierarchical architecture and undoes the lower level transaction(s) first before undoing the next higher level transaction(s). An exemplary implementation of such a nested transaction is that the method or the system may implement a modification as a nested database transaction that includes a lower-level transaction which aligns an edge of a dynamic object with another edge of a target object to indicate a violation of a spacing constraint.

In this exemplary implementation, the method may first move the edge of the dynamic object against the another edge of the target object, perform the constraint checking, generate, for example a graphical halo with text indicating the required minimum spacing value in a user interface, and then undo this lower-level transaction to continue with the modification process. In some embodiments, the method or system for implementing interactive, real-time checking or verification of constraints may comprise the respective process or module 410 of identifying or creating one or more scratch pads for the modification process in a substantial similar manner as that described for 310 with reference to FIG. 3. In various embodiments, a transaction collectively includes a single level transaction or a compounded, multi-level transaction.

In some embodiments, the method or system for implementing interactive, real-time checking or verification of constraints may comprise the respective process or module 412 of performing the modification process on the object to generate one or more changes. In some embodiments, the method or the system implements the modification process as a transaction and uses database techniques to manipulate the modification process. In some embodiments, the method or system for implementing interactive, real-time checking or verification of constraints may comprise the respective process or module 414 of determining whether or not one or more constraints are satisfied. In some embodiments, the method or system determines whether or not the one or more constraints are satisfied during the performance of the modification process without waiting for the modification process to complete.

In these embodiments, the method or system may thus capture various interim or transient data or information that is generated during the performance of the modification process. In some embodiments, the method or system for implementing interactive, real-time checking or verification of constraints may comprise the respective process or module 430 of determining whether or not the final or interim results of the modification process comply with or violate the one or more constraints. If the method or system determines that the modification results do not comply with at least some of the one or more constraints, the method or the system may further comprise the process or module 428 of undoing the transaction and the process or module 416 of providing a textual feedback, a graphical feedback, or a combination thereof based at least in part upon the one or more changes generated at 412, and the method or system may further proceed to 418.

In some embodiments where the method or system determines that the modification results comply with the one or more constraints, the method or the system may comprise the process or module 418 of identifying a final change for the object in a substantially manner as that described for 318 with reference to FIG. 3. In these embodiments, the method or the system may further comprise the process or module 420 of updating the data or information in the one or more scratch pads without contaminating the integrity of the original design database(s). In some embodiments, the method or system for implementing interactive, real-time checking or verification of constraints may comprise the respective process or module 422 of implementing the final change for the object.

In some embodiments, the method or system for implementing interactive, real-time checking or verification of constraints may comprise the respective process or module 424 of performing one or more post-modification checks on the object or on at least a portion of the layout to determine whether the object or the at least a portion of the layout complies with various constraints. In some embodiments, the method or system for implementing interactive, real-time checking or verification of constraints may comprise the respective process or module 426 of committing the data or information in the one or more scratch pads to the electronic design database(s).

Figure 5:
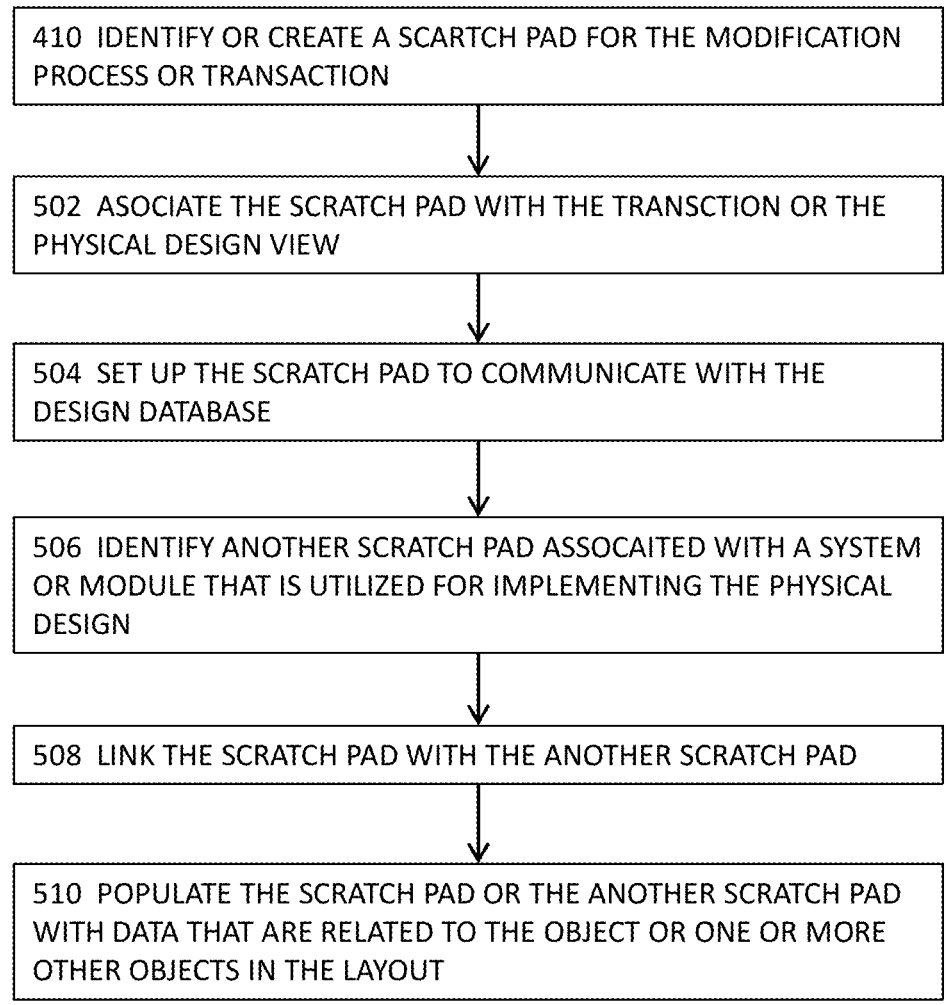
FIG. 5 illustrates more details about the process or module 410 illustrated in FIG. 4 for identifying or creating a scratch pad for the modification process or transaction in some embodiments.

FIG. 5 illustrates more details about the process or module 410 illustrated in FIG. 4 for identifying or creating a scratch pad for the modification process or transaction in some embodiments. In some embodiments, the process or module 410 for identifying or creating a scratch pad for the modification process or transaction may comprise the respective sub-process or sub-module 502 of associating the one or more scratch pads with the transaction or the layout view or a part thereof. In some embodiments, the association may include the use of a flag, link, pointer, or bitmap value to indicate which scratch pad is associated with which transaction or layout view of a part thereof. In some embodiments, the process or module 410 for identifying or creating a scratch pad for the modification process or transaction may comprise the respective sub-process or sub-module 504 of setting up the one or more scratch pads to communicate with the design database so the method or the system may read data or information from the design database and populate the data or information into the one or more scratch pads as well as write the data or information in the one or more scratch pads into the design database.

In some embodiments, the process or module 410 for identifying or creating a scratch pad for the modification process or transaction may optionally comprise the respective sub-process or sub-module 506 of identifying another scratch pad that is associated with a specific process, module, or design tool and is utilized to perform various functions described herein. As disclosed in the preceding paragraphs, some process, module, or design tool may have its own scratch pads in some embodiments. The process or module 506 identifies such scratch pads in these embodiments. In some embodiments, the process or module 410 for identifying or creating a scratch pad for the modification process or transaction may comprise the respective sub-process or sub-module 508 of linking the one or more scratch pads with the another scratch pad identified at 506 so these scratch pads communicate with each other to jointly perform various functions described here. In some embodiments, the process or module 410 for identifying or creating a scratch pad for the modification process or transaction may comprise the respective sub-process or sub-module 510 of populating the one or more scratch pads or the another scratch pad with data or information that is related to the object or to one or more objects (e.g., one or more target shapes) in the layout.

Figure 6:
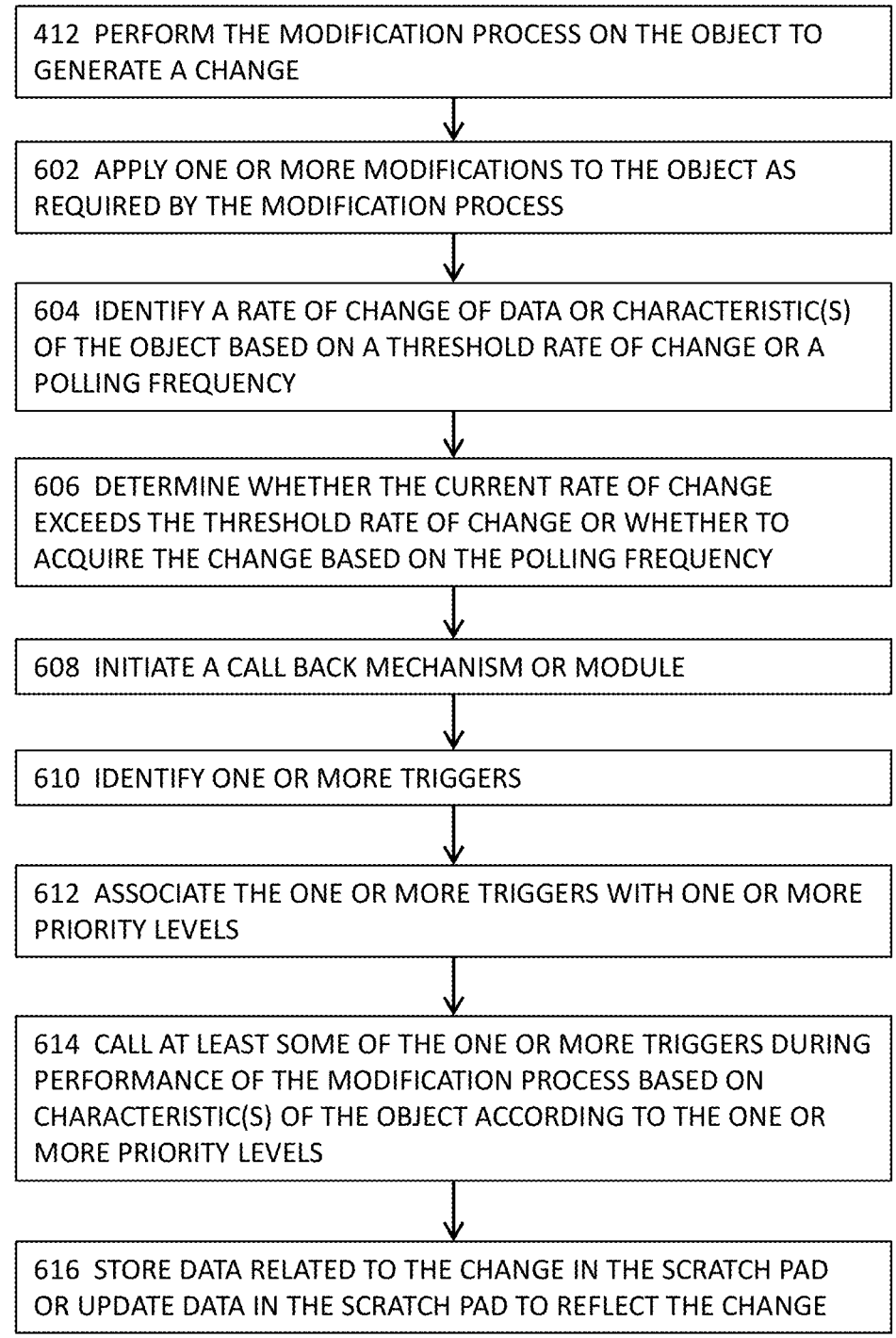
FIG. 6 illustrates more details about the process or module 412 illustrated in FIG. 4 for performing the modification process on the object to generate a change in some embodiments.

FIG. 6 illustrates more details about the process or module 412 illustrated in FIG. 4 for performing the modification process on the object to generate a change in some embodiments. In some embodiments, the process or module 412 for performing the modification process on the object to generate a change may comprise the respective sub-process or sub-module 602 of applying one or more modifications to the object as required or defined by the modification process. In some embodiments, the process or module 412 for performing the modification process on the object to generate a change may comprise the respective sub-process or sub-module 604 of identifying a rate of change of the data or one or more characteristics of the object.

In some embodiments, the method or the system identifies the rate of change based at least in part upon a threshold rate of change or a polling or sampling frequency in a substantially manner as that described for 202A or 214B with reference to FIGS. 2A and 2B respectively. In some embodiments, the process or module 412 for performing the modification process on the object to generate a change may comprise the respective sub-process or sub-module 606 of determining whether the current rate of change exceeds the threshold rate of change, or whether or not the method or system is to acquire data or information resulting from the modification process according to the polling or sampling frequency. For example, the sub-process or sub-module 606 may, for example, acquire data every fixed period of time based on the sampling or polling frequency in some embodiments.

In some embodiments, the sub-process or sub-module 606 ignores all the locations when the rate of change of the object exceeds the threshold rate of change. In the previous example, the sub-process or sub-module 606 may ignore all the locations of the object when the object is being moved if the threshold rate of change is set to zero. If the threshold rate of change comprises a non-zero value, the sub-process or sub-module 606 may ignore all the locations of the object when the object is being moved at a speed higher than the threshold rate of change. In these embodiments, the method or system may determine whether and how the changes arising from the modification process is to be captured and thus may analyze the electronic design based on the captured changes to provide an interactive or nearly real-time feedback to, for example, a designer via, for example, a user interface.

In some embodiments, the process or module 412 for performing the modification process on the object to generate a change may comprise the respective sub-process or sub-module 608 of initiating a callback mechanism or module. In some embodiments, the process or module 412 for performing the modification process on the object to generate a change may comprise the respective sub-process or sub-module 610 of identifying one or more triggers. More details about the callback mechanism or module and the one or more triggers will be provided in the following description with reference to FIG. 7. In some embodiments, the process or module 412 for performing the modification process on the object to generate a change may comprise the respective sub-process or sub-module 612 of associating the one or more triggers with one or more priority levels.

In some embodiments, the process or module 412 for performing the modification process on the object to generate a change may comprise the respective sub-process or sub-module 614 of calling or invoking at least some of the one or more triggers. In some embodiments, the method or system calls or invokes the at least some of the one or more triggers during the performance of the modification process such that the method or system may provide interactive or nearly real-time feedback for the electronic design in response to one or more operations of the modification process. In some embodiments, the process or module 412 for performing the modification process on the object to generate a change may comprise the respective sub-process or sub-module 616 of storing data or information, which is related to the one or more changes resulting from the modification process, in at least one of the one or more scratch pads or the another scratch pads to reflect the one or more changes. In some embodiments, the method or system may update the data or information in at least some of the one or more scratch pads or the another scratch pad to reflect the one or more changes arising out of the modification process. In these embodiments, the method or system does not yet commit the one or more changes or data or information related to the one or more changes.

Figure 7:
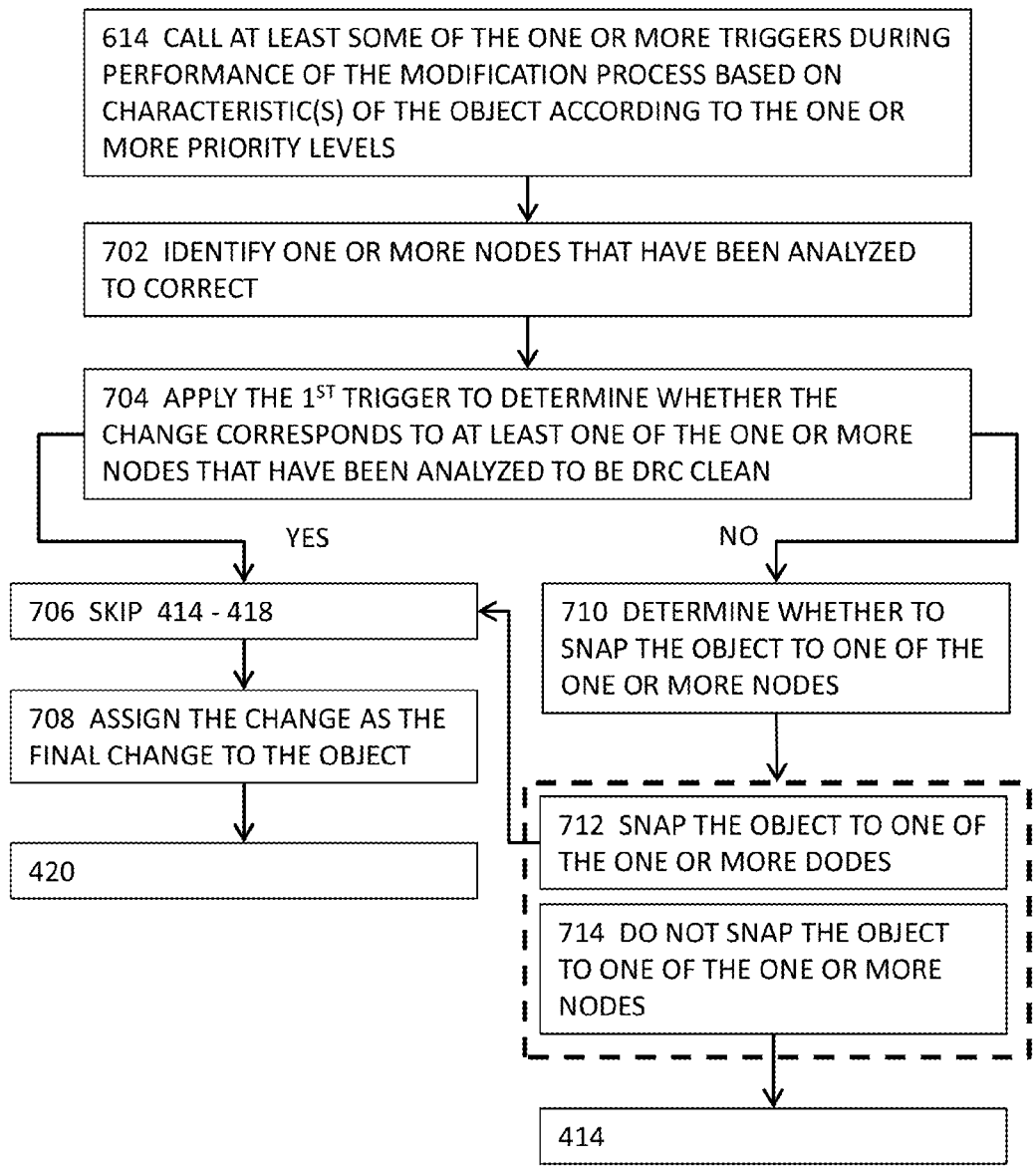
FIG. 7 illustrates more details about the process or module 614 illustrated in FIG. 6 for calling at least some of the one or more triggers during the performance of a modification process in some embodiments.

FIG. 7 illustrates more details about the process or module 614 illustrated in FIG. 6 for calling at least some of the one or more triggers during the performance of a modification process in some embodiments. In some embodiments, the process or module 614 for calling at least some of the one or more triggers may comprise the respective sub-process or sub-module 702 of identifying one or more nodes that have been analyzed to be correct. In some embodiments, each of the one or more nodes in the layout corresponds to a location in the layout. In some embodiments, a node is determined to be correct if an identical or similar object placed at the node has been analyzed to be design rule check (DRC) clean without violating some identical or similar set of constraints.

In some embodiments, the process or module 614 for calling at least some of the one or more triggers may comprise the respective sub-process or sub-module 704 of applying the first trigger to determine whether the one or more changes correspond to at least one of the one or more nodes that have been analyzed to be correct. In some embodiments where the method or system determines that the one or more changes correspond to at least some of the one or more nodes that have been analyzed to be correct, the process or module 614 for calling at least some of the one or more triggers may comprise the respective sub-process or sub-module 706 of skipping the processes or modules 414-418 and the sub-process or sub-module 708 of assigning the one or more changes as the final change to the object. The method or the system may then proceed to 420 as previously described.

In some embodiments where the method or system determines that the one or more changes do not correspond to any of the one or more nodes that have been analyzed to be correct, the process or module 614 for calling at least some of the one or more triggers may comprise the respective sub-process or sub-module 706 of determining whether to snap the object tone of the one or more nodes that have been analyzed to be correct. In some embodiments, the method or system may determine whether to snap the object to a node based on one or more criteria. The one or more criteria may comprise, for example, one or more constraints, one or more electrical requirements, one or more parasitic constraints, or a combination thereof, etc. In some embodiments, the method or the system may make the determination at 710 by invoking or calling another trigger.

In these embodiments, the another trigger is associated with an process of determining whether to snap an object to a previously analyzed node and is assigned a lower priority level than the first trigger because the method or the system calls or invokes the first trigger and performs its associated functions or processes before the method or system calls or invokes the another trigger. In these embodiments, the method or the system may further comprise the process or module 712 of snapping the object to one of the one or more nodes that have been analyzed to be correct by using a second trigger. In these embodiments, the second trigger is associated with a lower priority than the first trigger because the second trigger is called by the method or system after the method or the system calls the first trigger and perform its associated functions.

In some embodiments, the method or the system may select the node that is spatially closest to the one or more changes as node to snap the object to and skip the processes or modules 414-418 and proceed to 708 and then 420 directly. In these embodiments, the method or the system may further comprise the process or module 714 of not snapping the object to any of the one or more nodes by calling, for example, a third trigger. In these embodiments, the third trigger is associated with a lower priority level than the first trigger because the method or the system calls the first trigger and performs its associated functions before the method or system invokes the third trigger. In these embodiments, the method or the system may then proceed to 414 to continue the process.

Figure 8:
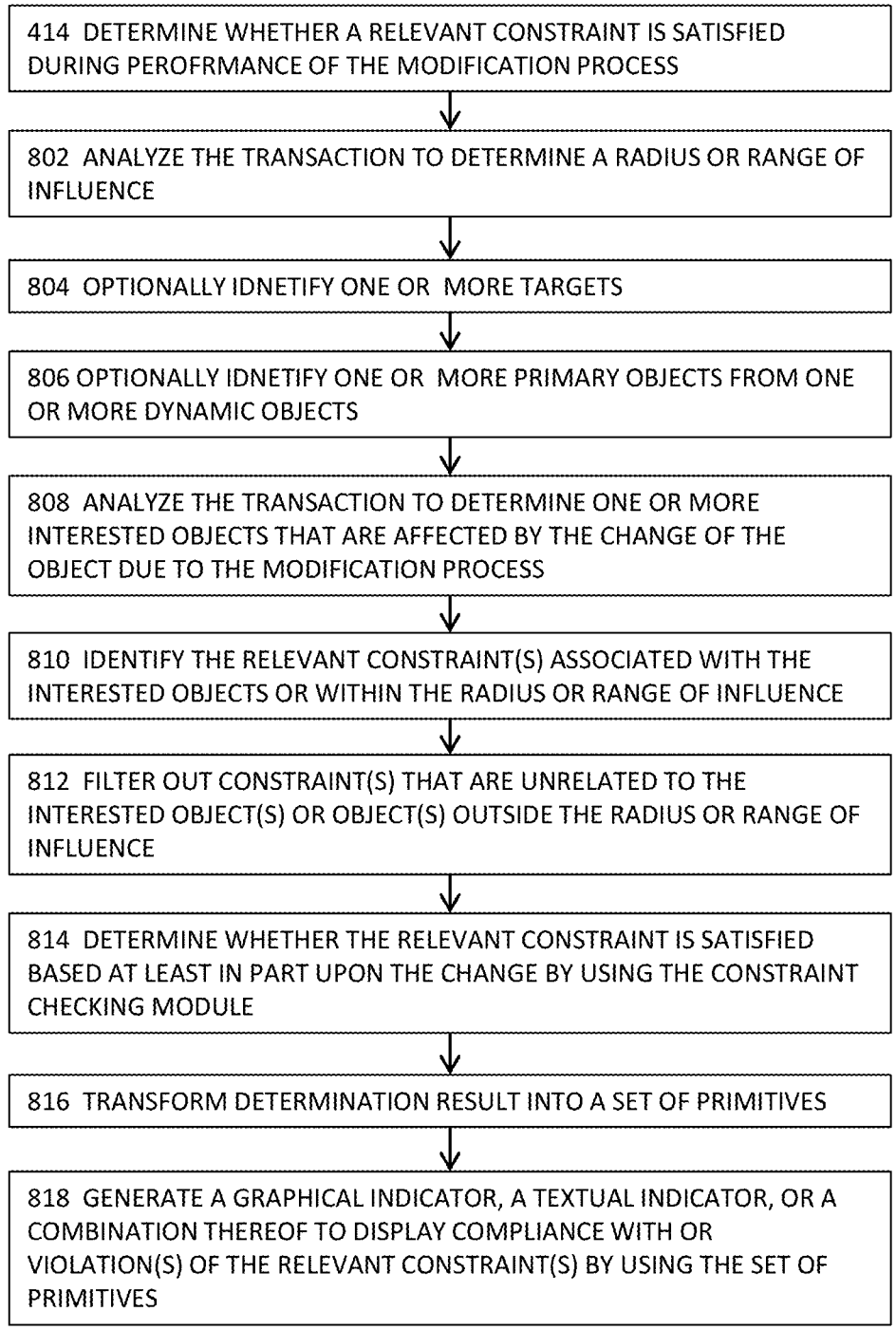
FIG. 8 illustrates more details about the process or module 414 illustrated in FIG. 4 for determining whether a relevant design rule or constraint is satisfied during performance of the modification process in some embodiments.

FIG. 8 illustrates more details about the process or module 414 illustrated in FIG. 4 for determining whether a relevant design rule or constraint is satisfied during performance of the modification process in some embodiments. In some embodiments, the process or module 414 for determining whether a relevant design rule or constraint is satisfied may comprise the process or module 802 of analyzing the transaction to determine a radius or range of influence. In some embodiments, the method or system analyzes the transaction to determine the range or radius of influence by examining, for example, the connectivity information associated with one or more objects (e.g., the object), the current location of the object in relation to one or more other objects, one or more constraints, one or more electrical requirements (e.g., requirements for avoiding cross-talk, requirements for coupled capacitance, etc.), any constraints involving multiple objects, or any objects (e.g., the object of interest, one or more neighboring objects of the object, or one or more objects the object of interest may interact with or influence upon, etc.) that the transaction may have an effect on, etc.

In some embodiments, the method or the system may determine the range or radius of influence to be the current view of the electronic design. In some embodiments where the determined range or radius of influence does not match the current view of the electronic design, the method or the system may adjust the current view of the electronic design (e.g., zoom in or zoom out) to display the range or radius of influence accordingly. In some embodiments, the process or module 414 for determining whether a relevant design rule or constraint is satisfied may comprise the process or module 804 of optionally identifying one or more targets. It shall be noted that a target may be identified or designated at any time in some embodiments.

For example, the method or system allows a designer to designate any shape as a target at any time by using, for example but not limited to, a point device, a menu command, a hot key or a combination of key strokes, a bind key, etc. A designer may even identify or designate one or more objects as targets when one or more constraints are being checked in some embodiments. In some embodiments, the process or module 414 for determining whether a relevant design rule or constraint is satisfied may comprise the process or module 806 of optionally identifying one or more primary objects from one or more dynamic objects. It shall be noted that a primary object may be identified or designated at any time in some embodiments.

For example, the method or system allows a designer to designate any shape as a primary object at any time by using, for example but not limited to, a point device, a menu command, a hot key or a combination of key strokes, a bind key, etc. A designer may even identify or designate one or more objects (e.g., one or more dynamic objects) as primary objects when one or more constraints are being checked in some embodiments. In some embodiments, the method or system uses a primary object as a tiebreaker during the constraint checking processes. For example, if the method or system identifies two sources to check certain constraints against, and if the method or system arrives at a situation where each of several options for the modification process gives rise to a constraint violation so no solution exists that will result in a DRC clean design for these two sources subject to a modification process, the method or the system may further identify one of the two sources as a tie breaker and check the relevant constraints against the primary object to determine how to apply the modification process to the dynamic object. As another example, the method or system may identify and designate or allow a user to identify or designate one dynamic object from a set of dynamic objects (e.g., an object in a cell instance or an n-well in a CMOS device instance) as a primary object and performs various functions or processes described herein to achieve various purposes in this disclosure.

In some embodiments, the process or module 414 for determining whether a relevant design rule or constraint is satisfied may comprise the process or module 808 of analyzing the transaction to determine one or more interested objects that may be affected by the one or more changes to the object arising out of the modification process on the object. In some embodiments, the method or the system may identify one or more target objects or at least some or all of the objects in the range or radius of influence at 808. In some embodiments, the process or module 414 for determining whether a relevant design rule or constraint is satisfied may comprise the process or module 810 of identifying one or more relevant constraints that are associated with the one or more interested objects that may be affected by the one or more changes to the object.

In some embodiments, the method or system may identify the one or more relevant constraints by using at least the connectivity information. In these embodiments, the method or system may identify a plurality of sets of one or more constraints that may be applied to the object of interest in an electronic design. Rather than running through all the constraints in the plurality of sets, the method or system identifies one or more relevant constraints from the plurality of sets and applies only the identified one or more relevant constraints to the object.

In some embodiments where an electronic design comprises a first net associated with one or more first sets of constraints and a second net associated with one or more second sets of constraints, the disclosed method or system may identify one a subset of one or more constraints from the one or more first sets and the one or more second sets and apply only the subset of one or more constraints to the first net and the second net for constraint checking purposes. For example, if the layout includes a first net (whether complete or incomplete) associated with one or more first sets of voltage-based constraints that impose different spacing requirements between the first net and other net(s) based on the operating voltages in the first net and a second net (whether complete or incomplete) associated with one or more second sets of voltage-based constraints that also impose different spacing requirements between the second net and other net(s) based on the operating voltages in the second net, the method may identify, for example, a first constraint from the one or more first sets that represents the worst-case scenario for the first net and a second constraint from the one or more second sets that also represents the worst-case scenario for the second net.

The method may then apply only the first constraint and the second constraint to the first net and the second net and determine whether the first net and the second net as currently designed satisfy these two constraints and provide the constraint checking results to the designer in an interactive, nearly real-time manner. In these embodiments, the method or system need not extract the corresponding objects to rebuild these nets of interest in the physical design to further identify the connectivity information for the constraint checking. Rather, the connectivity information for all the objects belonging to these nets of interest has been identified at the time(s) when these objects were created in the physical design for the first time. Therefore, the method or system may perform constraint checks by using whatever information or data, which already exists in one or more design databases, without performing the processes of identifying a list of objects for a net, extracting the objects, and rebuilding the net for constraint checking purposes.

In some embodiments, the method or system allows a user to identify a smaller subset of constraints from one or more larger sets of constraints that may apply to an object in the design and applies only the smaller subset of constraints to the object during constraint checking without having to running through all the constraints in the one or more larger sets of constraints. In these embodiments, a user may overload the system by specifying which constraints to use, for example, at a given point in time on any object in the electronic design, and the method or the system checks the object of interest against such specified constraints. In some embodiments, the process or module 414 for determining whether a relevant design rule or constraint is satisfied may comprise the process or module 812 of filtering out one or more constraints that are unrelated to or undesired for the one or more interested objects or for one or more objects that reside outside the radius or range of influence.

In some embodiments, the process or module 414 for determining whether a relevant design rule or constraint is satisfied may comprise the process or module 814 of determining whether the relevant constraint is satisfied based at least in part upon the one or more changes arising from the modification process by using, for example, the checker 118. In some embodiments, the process or module 414 for determining whether a relevant constraint is satisfied may comprise the process or module 816 of transforming the determination results of 814 into a set of primitives. In some embodiments, the set of primitives may comprise, for example, one or more line segments, one or more types of arrowheads, certain texts, certain variables whose values may be determined by the one or more relevant constraints, one or more graphical symbols to indicate various types of violations or compliance, etc.

In some embodiments, the process or module 414 for determining whether a relevant constraint is satisfied may comprise the process or module 818 of generating one or more indicators to display the compliance with or violation of the one or more relevant constraints. In some embodiments, the method or the system generates the one or more indicators by using at least the set of primitives. In these embodiments, the method or system constructs the one or more indicators by putting together one or more primitives according to what is to be displayed to identify compliance or violation. In some embodiments, the one or more indicators may comprise, for example but not limited to, one or more graphical symbols, one or more textual representations, or a combination thereof.

Figure 9:
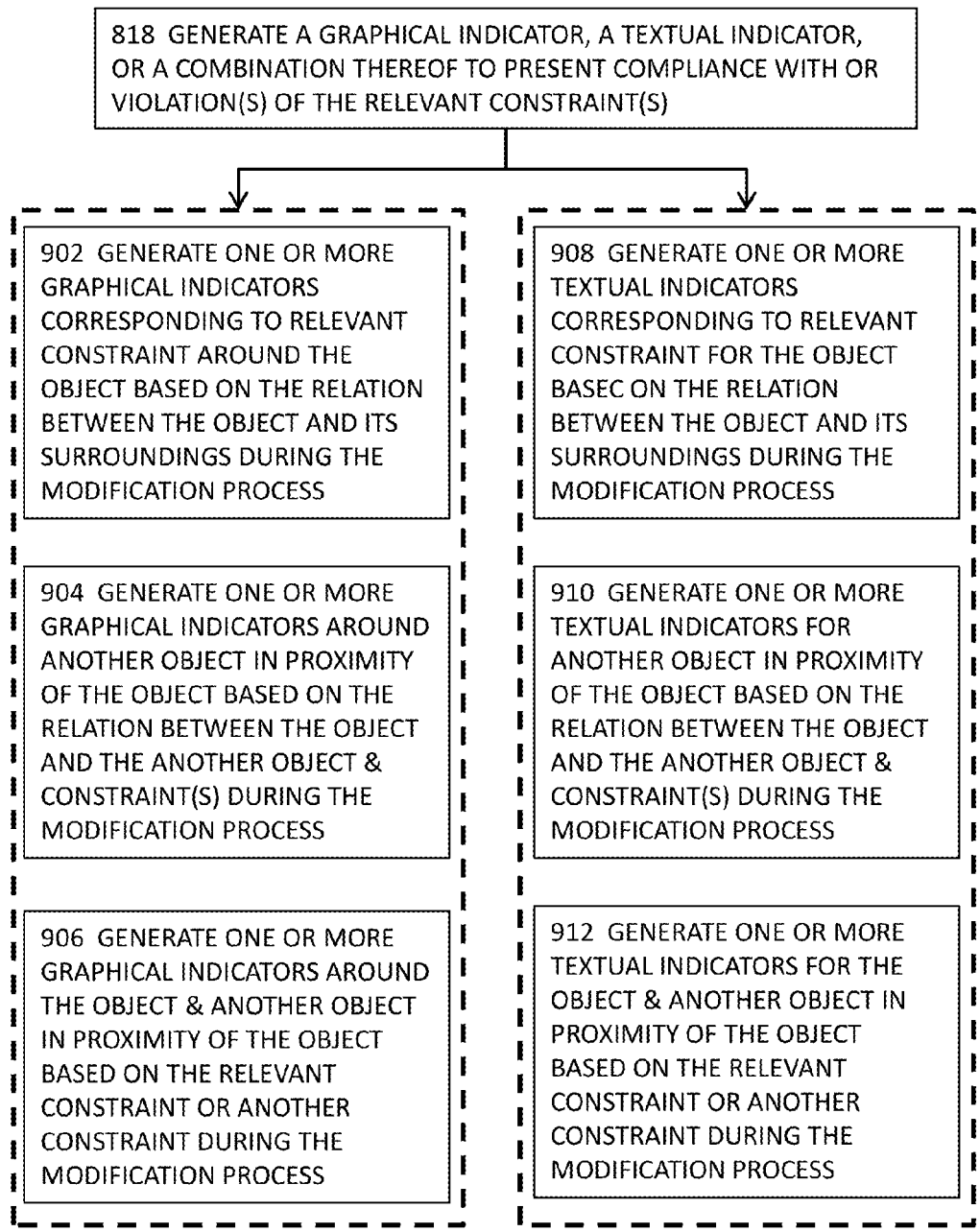
FIG. 9 illustrates more details about the process or module 818 illustrated in FIG. 8 for generating a graphical indicator, a textual indicator, or a combination to present compliance or violation of the relevant constraint(s) in some embodiments.

FIG. 9 illustrates more details about the process or module 818 illustrated in FIG. 8 for generating one or more indicators to present compliance or violation of the relevant constraint (s) in some embodiments. In some embodiments, the process or module 818 for generating one or more indicators may comprise the sub-process or sub-module of generating one or more graphical indicators (902) or textual indicators (908), or combinations thereof that correspond to the one or more relevant constraints around the dynamic object based at least in part upon a relation between the dynamic object and its surroundings. In some embodiments, the method or the system generates the one or more graphical indicators during the performance of the modification process.

In addition or in the alternative, the process or module 818 for generating one or more indicators may comprise the sub-process or sub-module of generating one or more graphical indicators (904) or textual indicators (910), or combinations thereof around another object that resides in certain proximity of the dynamic object based at least in part upon the a relation between the dynamic object and the another object in some embodiments. In some embodiments, the method or system generates such one or more graphical indicators during the performance of the modification process to provide interactive or nearly real-time feedback to a designer in response to the modification. In addition or in the alternative, the process or module 818 for generating one or more indicators may comprise the sub-process or sub-module of generating one or more graphical indicators (906) or textual indicators (912), or combinations thereof around the dynamic object and another object that resides in certain proximity of the dynamic object based on the one or more relevant constraints.

For example, the method or system may generate one or more halo with the optional texts showing information or data of the one or more relevant constraints around the dynamic object in some embodiments. The method or system may also generate one or more halos around each of one or more neighboring objects of the dynamic object in situations where the method or system anticipates one or more constraint violations may occur between the dynamic object and these one or more neighboring objects in some embodiments. In some embodiments, the display of the one or more indicators generated at 818 may be configured in such a way that each of the one or more indicators may be turned on or off in the user interface.

Figure 11:
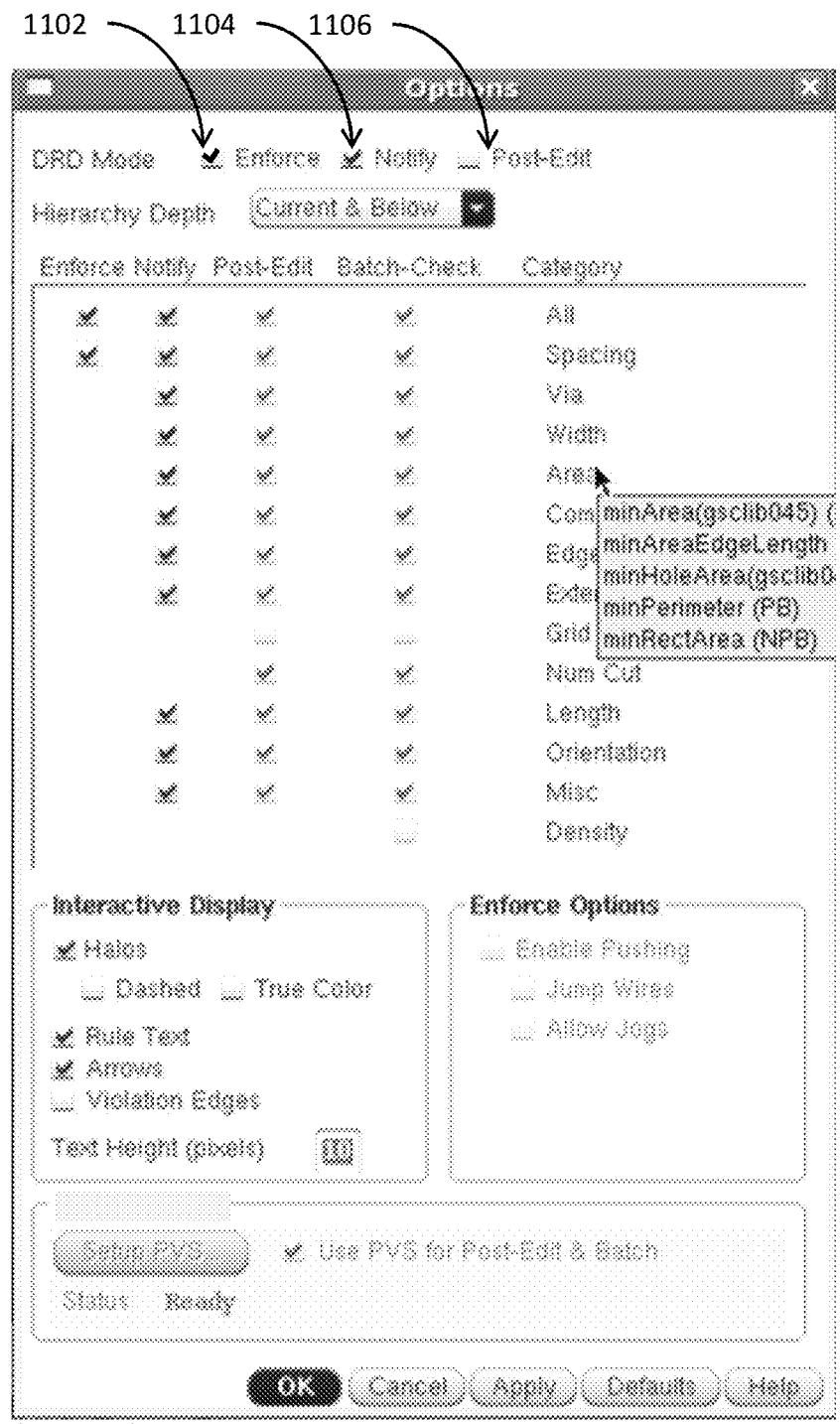
FIG. 11 illustrates some exemplary, configurable options of a method or a system for implementing interactive, real-time checking or verification of constraints in some embodiments.

FIG. 11 illustrates some exemplary, configurable options of a method or a system for implementing interactive, real-time checking or verification of constraints in some embodiments. More specifically, FIG. 11 illustrates that the method may provide three modes of operations—the first mode 1102 being the "Enforce" mode, the second mode 1104 being the "Notify" mode, and the third mode 1106 being the "Post-Edit" mode. It shall be noted that although FIG. 11 illustrates three modes of operations with some options for each mode, the three modes and these certain options are not intended to limit the scope of other implementations or embodiments or the scope of the claims, unless otherwise specifically recited or claimed.

More specifically, an exemplary Enforce operation mode enforces one or more constraints against one or more objects, one or more sources, one or more targets, or a combination thereof. For example, if the method or system identifies a spacing constraint that requires a certain spacing value between two objects, the method or system will enforce the required spacing value between two identified objects in some embodiments. In some of these embodiments, the method or system may enforce the one or more constraints, even at the expense of one or more other objects or one or more other constraints.

An exemplary Notify operation mode provides feedback to, for example, a user via a user interface to inform the user of one or more violations of one or more constraints that are not satisfied or enforced in some embodiments. In some of these embodiments, the method or system may provide such feedback at a particular instant of time or at any instant of time. For example, the method or system may provide such feedback at one or more predetermined points in time during or after the performance of a modification process in some embodiments or may provide such feedback interactively or in a nearly real-time manner during or after the performance of a modification process.

In some embodiments as illustrated in FIG. 11, the method or system may enable or may allow a user to enable both the "Enforce" mode 1102 and the "notify" mode at the same time. In these embodiments, the method or system may then enforce one or more constraints against one or more objects while notifying a user of the results of constraint checking for one or more other constraints that are not enforced by the method or system. In these embodiments, the method or system may overload a system with one or more constraints from one or more sets of constraints that are applicable to the same object or the same pair of objects for various corner or what-if analyses while keeping track of the remaining constraint(s) in the one or more sets or one or more other constraints and notify a user of one or more violations of these remaining constraint(s) or the one or more other constraints.

System Architecture Overview

Figure 10:
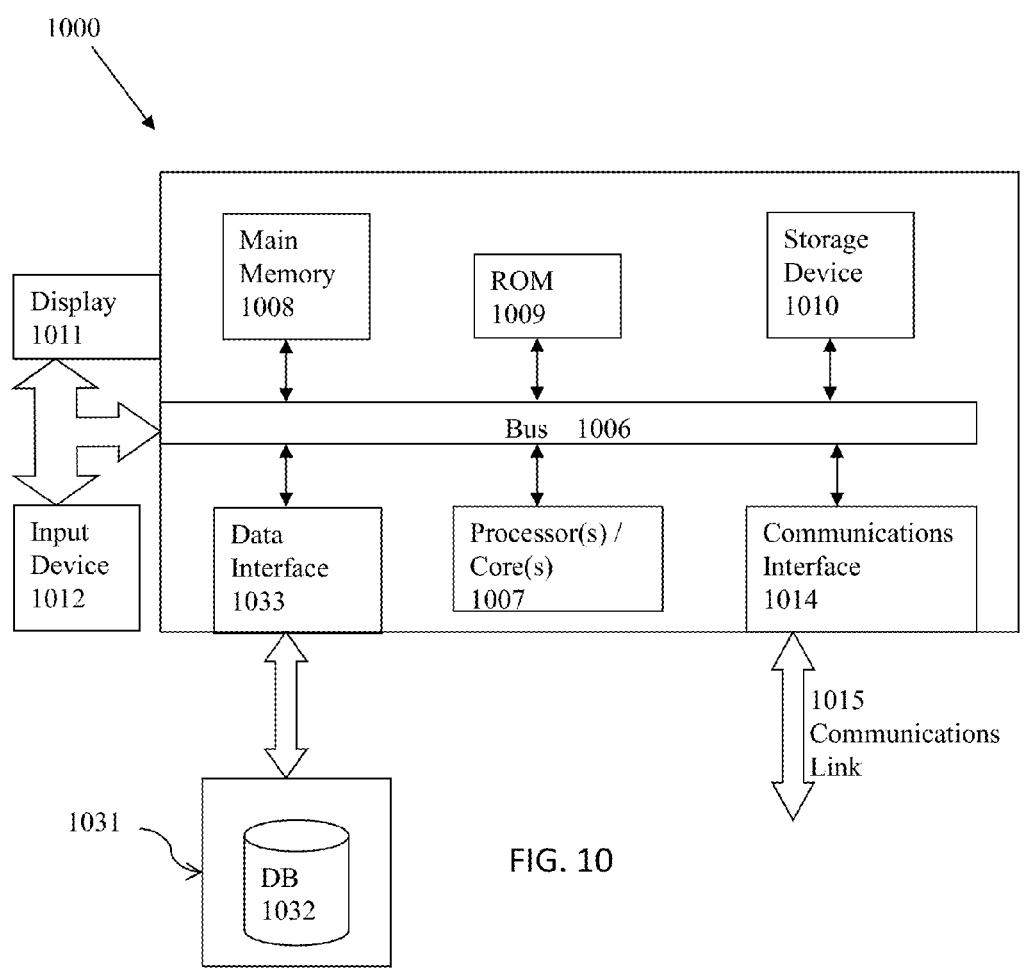
FIG. 10 illustrates a high level flow diagram for evaluating layout dependent effects in an electronic design by using multi-scenario physically-aware design methodology in some embodiments.

FIG. 10 illustrates a block diagram of an illustrative computing system 1000 suitable for implementing some embodiments of the method or system for implementing electronic circuit designs with electro-migration awareness as described in the preceding paragraphs with reference to various figures. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment, computer system 1000 performs specific operations by one or more processor or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1007, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout shapes or nets are created or modified.

The term "computer readable storage medium" or "computer usable storage medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 1033, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing interactive checking or verification of complex constraints, comprising:

using at least one processor or at least one processor core to perform a process the process comprising:

identifying an object from a layout of the electronic design;

determining a change for the object by at least identifying multiple sets of attributes of the object by using a dynamic data capture mechanism with a threshold rate of change or a sampling frequency;

performing a modification process to make the change in the object; a checking mechanism coupled to the at least one processor or the at least one processor core of a computing system and determining whether a relevant constraint is satisfied when the change is being made in the object by at least invoking one or more triggers according to one or more priority levels to perform one or more functions; and displaying, on a display apparatus of the computing system, a result of the act of determining whether the relevant constraint is satisfied.

2. The computer implemented method of claim 1, the action of performing the modification process comprises:
identifying or determining a dynamic data capture mechanism for the modification process;
identifying the change to the object based at least in part upon the dynamic data capture mechanism, wherein the change arises out of the modification process; and
storing the change in a scratch pad.

3. The computer implemented method of claim 2, in which the action of identifying the dynamic data capture mechanism comprises:
identifying or determining a static data capture process;
identifying a first set of one or more attributes of the object at a first time instant of the modification process;
identifying a second set of one or more attributes of the object at a second time instant of the modification process; and
identifying or determining the change to the object based at least in part upon the first set of one or more attributes and the second set of one or more attributes.

4. The computer implemented method of claim 3, in which the action of identifying or determining the change comprises:
comparing the first set of one or more attributes with the second set of one or more attributes to determine the change.

5. The computer implemented method of claim 2, in which the action of identifying the dynamic data capture mechanism comprises:
identifying the dynamic data capture mechanism;
monitoring an object characteristic of the object or a process characteristic of the modification process; and
identifying the threshold rate of change or the sampling frequency for the dynamic data capture mechanism.

6. The computer implemented method of claim 5, in which the action of identifying the dynamic data capture mechanism further comprises:
identifying a first set of one or more attributes of the object by using the dynamic data capture mechanism based at least in part upon the threshold rate of change or the sampling frequency;
monitoring a second set of one or more attributes of the object based at least in part upon the threshold rate of change or the sampling frequency; and
identifying the change by using at least the first set of one or more attributes and the second set of one or more attributes.

7. The computer implemented method of claim 1, the process further comprising:
creating one or more snapshots or maintaining one or more log records of a design database of the electronic design;
implementing the modification process as a database transaction; and
identifying or creating a scratch pad for the transaction.

8. The computer implemented method of claim 7, the action of determining whether the relevant constraint is satisfied further comprising:
undoing the transaction by using the one or more snapshots or the one or more log records based on a criterion, wherein the action of displaying the result further comprises:
generating one or more indicators based at least in part upon the result of the act of determining whether the relevant constraint is satisfied.

9. The computer implemented method of claim 1, the process further comprising:
determining whether the relevant constraint is satisfied during performance of the modification process and before the modification process is complete; and
displaying the result of the act of determining whether the relevant constraint is satisfied during the performance of the modification process and before the modification process is complete.

10. The computer implemented method of claim 1, the process further comprising:
identifying or determining a final change that is to be implemented for the object;
updating data or information in a scratch pad based at least in part upon the final change; and
implementing the final change for the object in the layout without committing the final change in a persistently stored design database of the electronic design.

11. The computer implemented method of claim 10, the process further comprising:
performing a post-modification check on at least a portion of the layout including the object after the modification process is complete; and
committing data or information related to the final change in the scratch pad to the persistently stored design database.

12. The computer implemented method of claim 7, the action of identifying or creating a scratch pad comprising:
associating the scratch pad with the layout;
setting up the scratch pad to communicate with the design database; and
populating the scratch pad with data or information from the design database.

13. The computer implemented method of claim 12, the action of identifying or creating a scratch pad further comprising:
identifying another scratch pad that does not share one or more resources with the scratch pad; and
linking the another scratch pad with the scratch pad for exchange of data or information, wherein the action of populating the scratch pad comprises:
populating the another scratch pad with the data or information or other data or information from the design database.

14. The computer implemented method of claim 1, the action of performing the modification process on the object comprising:
applying one or more modifications defined by the modification process to the object;
identifying a threshold rate of change;
identifying a rate of change of data or one or more characteristics of the object based at least in part upon the threshold rate of change; and
determining a relation between a current rate of change of the object and the threshold rate of change.

15. The computer implemented method of claim 14, the action of performing the modification process on the object further comprising:
identifying the one or more triggers;
associating the one or more priority levels with the one or more triggers; and
invoking at least one trigger of the one or more triggers according to the one or more priority levels to perform one or more functions associated with the at least one trigger during performance of the modification process based in part or in whole upon the one or more characteristics of the object or upon the rate of change.

16. The computer implemented method of claim 15, the action of invoking the at least one trigger comprising:
- identifying one or more nodes in the layout that have been analyzed to be correct; and
- applying the at least one trigger to determine whether a first change in the object resulting from the modification process corresponds to at least one node of the one or more modes.

17. The computer implemented method of claim 16, the action of invoking the at least one trigger comprising:
- snapping the object to the at least one node, wherein the process skips a determination of whether the relevant constraint is satisfied.

18. The computer implemented method of claim 1, the action of determining whether the relevant constraint is satisfied comprising:
- analyzing the modification process to determine a range of influence;
- identifying one or more neighboring objects within the range of influence; and
- identifying the relevant constraint or one or more other relevant constraints that are associated with the one or more neighboring objects.

19. The computer implemented method of claim 18, the action of determining whether the relevant constraint is satisfied further comprising:
- identifying one or more target objects form the one or more neighboring objects;
- identifying a primary object from the one or more objects including the object;
- determining whether the relevant constraint or the one or more other relevant constraints are satisfied by checking a first relation between the object and the one or more target objects or a second relation between the primary object and the one or more target objects, wherein the action of displaying the result of the act of determining whether the relevant constraint is satisfied comprises:
  - transforming the determination result into a set of primitives; and
  - constructing the result for the action of displaying the result by using at least the set of primitives.

20. An article of manufacture comprising a non-transitory computer readable storage medium having a sequence of instructions stored thereupon which, when executed by at least one processor or at least one processor core, causes the at least one processor or the at least one processor core to perform a method for implementing interactive checking or verification of complex constraints, the method comprising:
- using at least one processor or at least one processor core that is to:
- identifying an object from a layout of the electronic design;
- determining a change for the object by at least identifying multiple sets of attributes of the object by using a dynamic data capture mechanism with a threshold rate of change or a sampling frequency;
- performing a modification process to make the change in the object; a checking mechanism coupled to the at least one processor or the at least one processor core of a computing system and
- determining whether a relevant constraint is satisfied when the change is being made in the object by at least invoking one or more triggers according to one or more corresponding priority levels to perform one or more corresponding functions; and
- displaying, on a display apparatus of the computing system, a result of the act of determining whether the relevant constraint is satisfied.

21. The article of manufacture of claim 20, the process of performing the modification process comprises:
- identifying or determining a dynamic data capture mechanism for the modification process;
- identifying the change to the object based at least in part upon the dynamic data capture mechanism, wherein the change arises out of the modification process; and
- storing the change in a scratch pad, in which the action of identifying the data capture process comprises:
- identifying or determining a static data capture process;
- identifying a first set of one or more attributes of the object at a first time instant of the modification process;
- identifying a second set of one or more attributes of the object at a second time instant of the modification process; and
- identifying or determining the change to the object based at least in part upon the first set of one or more attributes and the second set of one or more attributes.

22. The article of manufacture of claim 21, in which the process of identifying the data capture process comprises:
- identifying the dynamic data capture mechanism;
- monitoring an object characteristic of the object or a process characteristic of the modification process;
- identifying the threshold rate of change or the sampling frequency for the dynamic data capture mechanism;
- identifying a first set of one or more attributes of the object by using the dynamic data capture mechanism based at least in part upon the threshold rate of change or the sampling frequency;
- monitoring a second set of one or more attributes of the object based at least in part upon the threshold rate of change or the sampling frequency; and
- identifying the change by using at least the first set of one or more attributes and the second set of one or more attributes.

23. The article of manufacture of claim 20, the process further comprising:
- creating one or more snapshots or maintaining one or more log records of a design database of the electronic design;
- implementing the modification process as a database transaction; and
- identifying or creating a scratch pad for the transaction, wherein the process of determining whether the relevant constraint is satisfied further comprising:
  - undoing the transaction by using the one or more snapshots or the one or more log records based on a criterion, wherein the action of displaying the result further comprises:
    - generating one or more indicators based at least in part upon the result of the act of determining whether the relevant constraint is satisfied.

24. The article of manufacture of claim 20, the process further comprising:
- determining whether the relevant constraint is satisfied during performance of the modification process and before the modification process is complete; and
- displaying the result of the act of determining whether the relevant constraint is satisfied during the performance of the modification process and before the modification process is complete.

25. The article of manufacture of claim 20, the process further comprising:
- identifying or determining a final change that is to be implemented for the object;
- updating data or information in a scratch pad based at least in part upon the final change;

implementing the final change for the object in the layout without committing the final change in a persistently stored design database of the electronic design;

performing a post-modification check on at least a portion of the layout including the object after the modification process is complete; and committing data or information related to the final change in the scratch pad to the persistently stored design database.

26. A system for implementing interactive checking or verification of complex constraints, comprising:

at least one processor or at least one processor core that is to:

identify an object from a layout of the electronic design;

determine a change for the object by at least identifying multiple sets of attributes of the object by using a dynamic data capture mechanism with a threshold rate of change or a sampling frequency;

perform a modification process to make the change in the object; a checking mechanism coupled to the at least one processor or the at least one processor core of a computing system and determine whether a relevant constraint is satisfied when the change is being made in the object by at least invoking one or more triggers according to one or more corresponding priority levels to perform one or more corresponding functions; and display, on a display apparatus of the computing system, a result of the act of determining whether the relevant constraint is satisfied.

27. The system of claim 26, the at least one processor or at least one processor core that is to perform the modification process is further to:

identify or determine a dynamic data capture mechanism for the modification process;

identify the change to the object based at least in part upon the dynamic data capture mechanism, wherein the change arises out of the modification process; and store the change in a scratch pad, in which the action of identifying the data capture process comprises:

identify or determine a static data capture process;

identify a first set of one or more attributes of the object at a first time instant of the modification process;

identify a second set of one or more attributes of the object at a second time instant of the modification process; and identify or determine the change to the object based at least in part upon the first set of one or more attributes and the second set of one or more attributes.

28. The system of claim 26, in which the at least one processor or at least one processor core that is to perform the modification process is further to:

identify the dynamic data capture mechanism;

monitor an object characteristic of the object or a process characteristic of the modification process;

identify the threshold rate of change or the sampling frequency for the dynamic data capture mechanism;

identify a first set of one or more attributes of the object by using the dynamic data capture mechanism based at least in part upon the threshold rate of change or the sampling frequency;

monitor a second set of one or more attributes of the object based at least in part upon the threshold rate of change or the sampling frequency; and identify the change by using at least the first set of one or more attributes and the second set of one or more attributes.

29. The system of claim 26, the at least one processor or at least one processor core that is further to:

create one or more snapshots or maintaining one or more log records of a design database of the electronic design;

implement the modification process as a database transaction; and identify or create a scratch pad for the transaction, wherein the at least one processor or at least one processor core that is to determine whether the relevant constraint is satisfied further to:

undo the transaction by using the one or more snapshots or the one or more log records based on a criterion, wherein the action of displaying the result further comprises:

generate one or more indicators based at least in part upon the result of the act of determining whether the relevant constraint is satisfied.

30. The system of claim 26, the at least one processor or at least one processor core that is further to:

determine whether the relevant constraint is satisfied during performance of the modification process and before the modification process is complete; and display the result of the act of determining whether the relevant constraint is satisfied during the performance of the modification process and before the modification process is complete.

31. The system of claim 26, the at least one processor or at least one processor core that is further to:

identify or determine a final change that is to be implemented for the object;

update data or information in a scratch pad based at least in part upon the final change;

implement the final change for the object in the layout without committing the final change in a persistently stored design database of the electronic design;

perform a post-modification check on at least a portion of the layout including the object after the modification process is complete; and commit data or information related to the final change in the scratch pad to the persistently stored design database.

* * * * *